US012231966B2

(12) United States Patent
Futaki et al.

(10) Patent No.: US 12,231,966 B2
(45) Date of Patent: *Feb. 18, 2025

(54) RADIO ACCESS NETWORK NODE, RADIO TERMINAL, AND METHOD THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,296

(22) Filed: Dec. 27, 2023

(65) Prior Publication Data
US 2024/0129824 A1    Apr. 18, 2024

Related U.S. Application Data

(63) Continuation of application No. 18/211,994, filed on Jun. 20, 2023, now Pat. No. 11,979,787, which is a
(Continued)

(51) Int. Cl.
*H04W 36/00* (2009.01)
*H04W 36/14* (2009.01)

(52) U.S. Cl.
CPC ........ *H04W 36/0022* (2013.01); *H04W 36/13* (2023.05); *H04W 36/144* (2023.05)

(58) Field of Classification Search
CPC ............. H04W 36/0022; H04W 36/13; H04W 36/144
See application file for complete search history.

(56) References Cited

U.S. PATENT DOCUMENTS 8,553,643 B2   10/2013  Flore et al.
10,028,128 B2   7/2018  Salkintzis
(Continued)

FOREIGN PATENT DOCUMENTS

CN    1543109 A    11/2004
CN    101052208 A  10/2007
(Continued)

OTHER PUBLICATIONS

3GPP TR 23.799, V.0.6.0 (Jul. 2016), "3rd Generation Partnership Project; Technical Specifications Group Services and System Aspects; Study on Architecture for Next Generation System (Release 14)," Jul. 2016, 320 pages.
(Continued)

*Primary Examiner* — Brenda H Pham
(74) *Attorney, Agent, or Firm* — Sughrue Mion, PLLC

(57) ABSTRACT

A target RAN node (3) receives, from a core network (5), a message requesting a handover of a radio terminal (1) from a bearer-based network to a bearer-less network. This handover request message includes flow information related to at least one session to be established in the bearer-less network in order to transfer at least one packet flow of the radio terminal (1). The target RAN node (3) transmits, to the core network (5), a handover acknowledge response message containing a transparent container that includes a radio resource configuration information derived from the flow information and is to be forwarded to a source RAN node associated (2) through the core network (5). It is thus, for example, possible to appropriately configuring an AS layer of a target RAT in an inter-RAT handover.

4 Claims, 37 Drawing Sheets

Related U.S. Application Data continuation of application No. 17/712,279, filed on Apr. 4, 2022, now Pat. No. 11,800,420, which is a continuation of application No. 16/321,877, filed as application No. PCT/JP2017/018317 on May 16, 2017, now Pat. No. 11,330,492.

(56) References Cited

U.S. PATENT DOCUMENTS

| | | | |
|---|---|---|---|
| 10,644,955 | B2 | 5/2020 | Zhang et al. |
| 11,330,492 | B2* | 5/2022 | Futaki ............... H04W 36/14 |
| 11,800,420 | B2* | 10/2023 | Futaki ............ H04W 36/0055 |
| 11,979,787 | B2* | 5/2024 | Futaki ............ H04W 36/0022 |
| 2002/0191556 | A1* | 12/2002 | Krishnarajah ........ H04W 28/06 370/352 |
| 2004/0057400 | A1 | 3/2004 | Walsh et al. |
| 2007/0021120 | A1 | 1/2007 | Flore et al. |
| 2007/0281697 | A1* | 12/2007 | Davis ............... H04W 36/12 455/436 |
| 2008/0049677 | A1 | 2/2008 | Hayashi |
| 2009/0016259 | A1 | 1/2009 | Zhang et al. |
| 2012/0207129 | A1 | 8/2012 | Sun |
| 2013/0010611 | A1 | 1/2013 | Wiemann et al. |
| 2013/0017826 | A1 | 1/2013 | Bergquist et al. |
| 2013/0128866 | A1 | 5/2013 | Zhang et al. |
| 2014/0051443 | A1 | 2/2014 | Diachina et al. |
| 2015/0139195 | A1 | 5/2015 | Xiao et al. |
| 2015/0215822 | A1 | 7/2015 | Won et al. |
| 2015/0229491 | A1 | 8/2015 | Solovyev et al. |
| 2015/0264609 | A1 | 9/2015 | Zhang et al. |
| 2015/0282021 | A1 | 10/2015 | Pao et al. |
| 2016/0057783 | A1 | 2/2016 | Rosa et al. |
| 2016/0205578 | A1 | 7/2016 | Lee et al. |
| 2016/0227459 | A1 | 8/2016 | Fujishiro et al. |
| 2016/0353465 | A1 | 12/2016 | Vrzic et al. |
| 2017/0034749 | A1 | 2/2017 | Chandramouli |
| 2017/0079059 | A1 | 3/2017 | Li et al. |
| 2017/0086118 | A1 | 3/2017 | Vrzic |
| 2017/0164349 | A1 | 6/2017 | Zhu et al. |
| 2017/0195935 | A1 | 7/2017 | Xu |
| 2017/0288972 | A1 | 10/2017 | Li et al. |
| 2017/0289019 | A1 | 10/2017 | Faccin |
| 2017/0289046 | A1 | 10/2017 | Faccin et al. |
| 2017/0332295 | A1 | 11/2017 | Sunay |
| 2017/0339609 | A1 | 11/2017 | Youn et al. |
| 2017/0359768 | A1 | 12/2017 | Byun et al. |
| 2017/0367110 | A1 | 12/2017 | Li et al. |
| 2018/0014224 | A1 | 1/2018 | Cheng et al. |
| 2018/0020382 | A1 | 1/2018 | Kim et al. |
| 2018/0035339 | A1 | 2/2018 | Mitsui et al. |
| 2018/0124660 | A1 | 5/2018 | Zhang et al. |
| 2018/0242304 | A1 | 8/2018 | Rong et al. |
| 2018/0288654 | A1 | 10/2018 | Shih et al. |
| 2018/0368140 | A1 | 12/2018 | Centonza et al. |
| 2019/0021043 | A1 | 1/2019 | Youn et al. |
| 2019/0029000 | A1 | 1/2019 | Vikberg et al. |
| 2019/0098544 | A1 | 3/2019 | Han et al. |
| 2019/0150219 | A1 | 5/2019 | Wang et al. |
| 2019/0158360 | A1 | 5/2019 | Xu et al. |
| 2019/0159027 | A1 | 5/2019 | Kuge et al. |
| 2019/0174368 | A1 | 6/2019 | Decarreau et al. |
| 2019/0174377 | A1 | 6/2019 | Decarreau ............ H04W 36/08 |
| 2019/0182733 | A1 | 6/2019 | Shimojou et al. |
| 2019/0182737 | A1 | 6/2019 | Futaki et al. |
| 2019/0253944 | A1 | 8/2019 | Kim |
| 2019/0261233 | A1 | 8/2019 | Duan et al. |
| 2019/0306761 | A1 | 10/2019 | Jin et al. |
| 2019/0357131 | A1 | 11/2019 | Sivavakeesar et al. |
| 2020/0059989 | A1 | 2/2020 | Velev et al. |
| 2020/0305054 | A1 | 9/2020 | Zee et al. |
| 2021/0266820 | A1 | 8/2021 | Lou et al. |

FOREIGN PATENT DOCUMENTS

| | | |
|---|---|---|
| CN | 101237677 A | 8/2008 |
| CN | 101291537 A | 10/2008 |
| CN | 101600238 A | 12/2009 |
| CN | 101682532 A | 3/2010 |
| CN | 101801055 A | 8/2010 |
| CN | 101808374 A | 8/2010 |
| CN | 101841824 A | 9/2010 |
| CN | 102104927 A | 6/2011 |
| CN | 102215537 A | 10/2011 |
| CN | 102223669 A | 10/2011 |
| CN | 102771158 A | 11/2012 |
| CN | 103067864 A1 | 4/2013 |
| CN | 103548387 A | 1/2014 |
| CN | 104025639 A | 9/2014 |
| CN | 104053200 A | 9/2014 |
| CN | 104221405 A | 12/2014 |
| CN | 104936237 A | 9/2015 |
| CN | 105376811 A | 3/2016 |
| CN | 105432135 A | 3/2016 |
| CN | 105637905 A | 6/2016 |
| CN | 105813195 A | 7/2016 |
| CN | 109526252 A | 3/2019 |
| CN | 109565732 A | 4/2019 |
| EP | 2870795 A | 5/2015 |
| JP | 2007-214704 A | 8/2007 |
| JP | 2010-28816 A | 2/2010 |
| JP | 2011-151828 A | 8/2011 |
| JP | 2012-186865 A | 9/2012 |
| JP | 2015-527846 A | 9/2015 |
| JP | 2015-192453 A1 | 10/2015 |
| JP | 2020-039182 A | 3/2020 |
| WO | 2011/020487 A1 | 2/2011 |
| WO | 2011/021876 A2 | 2/2011 |
| WO | 2012/055446 A1 | 5/2012 |
| WO | 2013/033883 A1 | 3/2013 |
| WO | 2014/005653 A1 | 1/2014 |
| WO | 2014/158084 A1 | 10/2014 |
| WO | 2014/161161 A1 | 10/2014 |
| WO | 2015/115761 A1 | 8/2015 |
| WO | 2015/119547 A1 | 8/2015 |
| WO | 2015/139763 A1 | 9/2015 |
| WO | 2015/160329 A1 | 10/2015 |
| WO | 2015/162088 A1 | 10/2015 |
| WO | 2015/168918 A1 | 11/2015 |
| WO | 2015/169387 A1 | 11/2015 |
| WO | 2018/028342 A1 | 2/2018 |

OTHER PUBLICATIONS

Intel, "Solutions for Interworking and migration," SA WG2 Meeting #116, S2-164247, Jul. 11-15, 2016, pp. 1-3.

International Search Report of PCT/JP2017/018317 dated Aug. 8, 2017.

Communication dated Apr. 18, 2019, from the European Patent Office in counterpart European Application No. 17839007.6.

Huawei, HiSilicon, "Considerations on 5G RAN QoS framework", 3GPP TSG-RAN2 Meeting #94; R2-164267, Nanjing, China, May 22, 2016 (2 pages total).

"3rd Generation Partnership Project; Techical Specification Group Radio Access Network; NR; NR and NG-RAN Overall Description; Stage 2 (Release 15)", 3GPP TS 38.300 V0.2.1, Technical Specification, May 2017, pp. 1-48.

"3rd Generation Partnership Project; Technical Specification Group Core Network and Terminals; Evolved Packet System (EPS); 3GPP Sv interface (MMME to MSC, and SGSN to MSC) for SRVCC (Release 14)", 3GPP TS 29.280 V14.0.0, Technical Specification, Mar. 2017, pp. 1-23.

Communication issued Jan. 21, 2020 by the Japanese Patent Office in application No. 2016-533428.

Chinese Office Action for CN Application No. 201780062412.X mailed on Oct. 29, 2020 with English Translation.

3GPP TS 23.401 V14.0.0 (Jun. 2016), Technical Specification Group Services and System Aspects; General Packet Radio Service

(56) References Cited

OTHER PUBLICATIONS (GPRS) enhancements for Evolved Universal Terrestrial Radio Access Network (E-UTRAN) access (Release 14), pp. 1-374.
3GPP TS 48.018 V13.2.0 (Jun. 2016), Technical Specification Group GSM/EDGE Radio Access Network; General Packet Radio Service (GPRS); Base Station System (BSS)—Serving GPRS Support Node (SGSN); BSS GPRS Protocol (BSSGP) (Release 13), pp. 1-205.
3GPP TS36.413 V13.3.0 (Jun. 2016), Technical Specification Group Radio Access Network, Evolved Universal Terrestrial Radio Access Network (E-UTRAN); S1 Application Protocol (S1AP) (Release 13), pp. 1-331.
3GPP TR23.799 V0.7.0 (Aug. 2016), Technical Specification Group Services and System Aspects; Study on Architecture for Next Generation System (Release 14), pp. 1-322.
3GPP TS25.413 V13.2.0 (Jun. 2016), Technical Specification Group Radio Access Network; UTRAN Iu interface Radio Access Network Application Part (RANAP) signalling (Release 13), pp. 1-451.
3GPP TS43.129 V13.0.0 (Dec. 2015), Technical Specification Group GSM/EDGE Radio Access Network; Packet-switched handover for GERAN A/GB mode; Stage 2 (Release 13), pp. 1-95.
CATT, "Inter-RAT mobility in NR", R2-163472, RAN WG2 Meeting #94, China, May 23-27, 2016, pp. 1-4.
Huawei, "Inter-RAT handover", R3-161140, RAN WG3 Meeting #92, China, May 23-27, 2016.
3GPP TR 23.799, V.0.6.0 (Jul. 2016), Technical Specification Group Services and System Aspects; Study on Architecture for Next Generation System (Release 14), pp. 1-320.
Intel, "Solution for interworking and migration", SA WG2 Meeting #116, S2-164247, Jul. 11-15, 2016, pp. 1-3.
Huawei et al: "Considerations on 5G RAN QoS framework", 3GPP TSG-RAN2 Meeting #94, R2-164267, May 22, 2016, China.
3GPP TS 38.300 V0.2.1, Technical Specification Group Radio Access Network; NR; NR and NG-RAN Overall Description; Stage 2 (Release 15), May 10, 2017, pp. 1-48.
3GPP TS 29.280 V14.0.0, Technical Specification Group Core Network and Terminals; Evolved Packet System (EPS); 3GPP Sv interface (MME to MSC, and SGSN to MSC) for SRVCC (Release 14), Mar. 22, 2017, pp. 1-23.
3GPP TR 38.801 V0.2.0 (Jun. 2016), Technical Specification Group Radio Access Network; Study on New Radio Access Technology; Radio Access Architecture and Interfaces (Release 14), pp. 1-20.
ETRI et al., "NextGen Core Architecture solution for Network Slice Instance Selection", 3GPP SA WG2 Meeting #115, S2-162551, May 23-27, 2016, China, pp. 1-5.
ZTE, "Consideration on RAN Side Network Slicing", 3GPP TSG RAN WG3 Meeting #91bis, R3-160821, Apr. 11-15, 2016, India.
NEC, "RAN architecture impact due to Network Slicing", 3GPP TSG RAN2 #93bis, R2-162891, Apr. 11-15, 2016, Croatia.
Nokia, "Solution: Mobility Options", Apr. 11-15, 2016, SA WG2 Meeting # S2-114, S2-161625, France, pp. 1-5.
Huawei, "Slice impact on mobility", 3GPP TSG-RAN WG3 95bis, R3-171789, China, May 15-19, 2017.
NTT DOCOMO, "Solution to support a UE with simultaneous connections to multiple Network Slices", 3GPP Draft, SA WG2 Meeting #113AH, S2-161043, Feb. 18, 2016, France, pp. 1-4.
Samsung, "Inter-RAT handover with Lte", 3GPP TSG-RAN WG3#92, R3-161486, May 27, 2016, China.
NTT DOCOMO, "Update of Network Slicing Solution 1.3", 3GPP TSG-SA WG2#116, S2-163446, Jul. 5, 2016, pp. 1-8.
Nokia, Alcatel Lucent Shanghai Bell, "Update to Solution 2.3: Content Aware QoS Framework", 3GPP TSG SA WG2#115, S2-162706, May 2016, China, pp. 1-7.
Huawei, HiSilicon, "Update of Solution #1 for Key issue #1", 3GPP TSG SA WG2#114, S2-161503, Apr. 2016, France.
Huawei, "Requirements and functionalities of the interface between LTE and NR", 3GPP TSG-RAN3 Meeting #92, R3-161138, Nanjing, China, May 23-27, 2016.
Samsung, "RAN-CN interface aspects", 3GPP TSG-RAN WG3 Meeting #92, R3-161061, Nanjing, P.R., China, May 23-27, 2016.

3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 13), 3GPP TS 36.300 V13.4.0, Jun. 2016, pp. 1-314.
Nokia, Alcatel-Lucent Shanghai Bell, "Interface consideration for tight LTE/NR interworking anchored to NextGen Core", 3GPP TSG-RAN WG2 Meeting #93bis, R2-162421, Dubrovnik, Croatia, Apr. 11-15, 2016.
3rd Generation Partnership Project; Technical Specification Group Services and Systems Aspects; 3GPP System Architecture Evolution (SAE); Security architecture (Release 13), 3GPP TS 33.401 V13.3.0, Jun. 2016, pp. 1-148.
Ericsson, "Lossless Inter-RAT handover with 5GC", 3GPP TSG-RAN WG2 #97, Tdoc R2-1700877, Athens, Greece, Feb. 13-17, 2017, 1/3-4/3.
Samsung, "Assignment of CP and UP network functions during an MM procedure", SA WG2 Meeting #116, S2-163297, Jul. 11-15, 2016, Vienna, Austria, pp. 1-6.
CATT, "Control plane for support of NR standalone operation", 3GPP TSG RAN WG2 Meeting #94, R2-163468, May 23-27, 2016, Nanjing, China, pp. 1-5.
China Mobile et al., "Network Slicing Architecture and High-Level Function Definition", SA WG2 Meeting #115, S2-162365, May 23-27, 2016, Nanjing, China, pp. 1-5.
ETRI, "High-level Functional Architecture for the Network Slicing", SA WG2 Meeting #114, S2-161833, Apr. 11-15, 2016, Sophia Antipolis, France, pp. 1-4.
ZTE, "Network Slice Selection Procedure", 3GPP Draft, TSG RAN WG3 Meeting #92, R3-161107, May 22, 2016, China.
Huawei, HiSilicon, "Network slicing considerations", 3GPP TSG-RAN WG2 Meeting #93bis R2-162664, Apr. 1, 2016, Croatia.
3GPP TR 23.799 V0.4.0, Technical Specification Group Services and System Aspects; Study on Architecture for Next Generation System (Release 14), pp. 1-96.
Chinese Office Communication for CN Application No. 201780048078.2 mailed on Aug. 2, 2021 with English Translation.
Yang Xiao-Long et al., Spectrum handoff model based on preemptive queuing theory in cognitive radio networks, Acta Phys. Sin. vol. 64, No. 10, Apr. 19, 2015.
Zhao Su et al., A Handover Algorithm Based on Prediction of Adjustable Threshold Hysteresis Margin in Ultra Dense Network, Journal of Electronics & Information Technology, vol. 38, No. 3, Mar. 15, 2016.
International Search Report for PCT Application No. PCT/JP2017/018323, mailed on Jun. 20, 2017.
Samsung, "Assignment of CP and UP network functions during an MM procedure", 3GPP SA WG2 Meeting #116, S2-164041, Jul. 15, 2016, Austria.
U.S. Office Action and PTO-892 for U.S. Appl. No. 16/321,864 mailed on Nov. 29, 2021.
Japanese Office Action for JP Application No. 2021-025225 mailed on Feb. 22, 2022 with English Translation.
Ericsson, "Update of QoS Interim agreements", 3GPP TSG-SA WG2#116, S2-163337, Jul. 5, 2016, Austria, p. 1-4.
U.S. Office Action and PTO-892 for U.S. Appl. No. 16/321,998 mailed on Mar. 15, 2022.
U.S. Office Action for U.S. Appl. No. 16/321,998, mailed on Sep. 29, 2022.
U.S. Office Action for U.S. Appl. No. 17/385,428 mailed on Oct. 4, 2022.
JP Office Action for JP Application No. 2022-092163, mailed on Apr. 4, 2023 with English Translation.
3GPP TS36.423 V13.4.0 (Jun. 2016), "X2 application protocol (X2AP)", (Release 13).
S2-163520, "Update the solution 6.2.1.1: Relation between PDU Flow and Service Data Flow", SA WG2 Meeting #116 (Jul. 11-15, 2016).
R3-161129, "NR RAN functions", 3GPP TSG-RAN3 Meeting #92 (May 23-27, 2016).
3GPP TS36.423 V13.4.0 (Jun. 2016), 3rd Generation Partnership Project; Technical Specification Group Radio Access Network;

(56) References Cited

OTHER PUBLICATIONS

Evolved Universal Terrestrial Radio Access Network (E-UTRAN); X2 application protocol (X2AP) (Release 13).
ETRI, Update the solution 6.2.1.1: Relation between PDU Flow and Service Data Flow, S2-163520, SA WG2 Meeting #116, Jul. 11-15, 2016.
Huawei, NR RAN functions, R3-161129, 3GPPT TSG-RAN3 Meeting #92, May 23-27, 2016.
JP Office Action for JP Application No. 2022-130339, mailed on Jun. 27, 2023 with English Translation.
Qualcomm Incorporated, NR Mobility, 3GPP TSG-RAN WG3#92, R3-161343, May 27, 2016, pp. 1-2.
JP Office Action for JP Application No. 2022-167447, mailed on Jul. 4, 2023 with English Translation.
Huawei, Clean up of remaining FFS on Security, 3GPP TSG RAN WG3 #100 R3-183388, May 28, 2018.
Nokia (rapporteur), TS 38.413—latest agreed version (V0.1.0), 3GPP TSG RAN WG3 adhoc_R3 AH_NR 1706 R3-172260, Jun. 20, 2017.
U.S. Office Action for U.S. Appl. No. 17/385,428, mailed on Jul. 12, 2023.
U.S. Office Action for U.S. Appl. No. 16/321,998, mailed on Jul. 26, 2023.
CN Office Action for CN Application No. 202111203306.3, mailed on Nov. 13, 2023 with English Translation.
CN Office Action for CN Application No. 202110653734.X, mailed on Jan. 2, 2024 with English Translation.
CN Office Action for Chinese Patent Application No. 202111018745.7, mailed on Jan. 1, 2024 with English Translation.
Huawei, "Network slicing considerations", 3GPP TSG-RAN WG3 Meeting #91bis R3-160833, Apr. 15, 2016.
CN Office Action for CN Application No. 202111018747.6, mailed on Oct. 28, 2023 with English Translation.
JP Office Action for JP Application No. 2023-119539, mailed on Jun. 4, 2024 with English Translation.
Nokia, Alcatel-Lucent Shanghai Bell, "Context Aware QoS Framework for GBR services", 3GPP TSG-SA WG2#116 S2-163799, Jul. 17, 2016, p. 1-p. 10.
U.S. Office Action for U.S. Appl. No. 18/225,421, mailed on Mar. 14, 2024.
CN Office Action for CN Application No. 202110655351.6, mailed on Jan. 1, 2024 with English Translation.
U.S. Office Action for U.S. Appl. No. 17/376,920, mailed on Jun. 20, 2024.
CN Office Communication for CN Application No. 202110326994.6, mailed on Sep. 2, 2024 with English Translation.
Huawei, "Network slice selection", RAN WG3 Meeting #92 R3-161134, May 27, 2016, pp. 1-pp. 4.
CN Office Action for CN Application No. 202111018747.6, mailed on Aug. 1, 2024 with English Translation.
US Office Action for U.S. Appl. No. 17/376,920, mailed on Dec. 3, 2024.
CN Office Action for CN Application No. 202110324177.7, mailed on Sep. 26, 2024 with English Translation.
CN Office Action for CN Application No. 202111018745.7, mailed on Dec. 5, 2024 with English Translation.

\* cited by examiner

```
-- ASN1START

MobilityFromEUTRACommand ::=              SEQUENCE {
    rrc-TransactionIdentifier             RRC-TransactionIdentifier,
    criticalExtensions                    CHOICE {
        c1                                CHOICE {
            mobilityFromEUTRACommand-r8   MobilityFromEUTRACommand-r8-IEs,
            mobilityFromEUTRACommand-r9   MobilityFromEUTRACommand-r9-IEs,
            spare2 NULL, spare1 NULL
        },
        criticalExtensionsFuture          SEQUENCE {}
    }
}

MobilityFromEUTRACommand-r8-IEs ::= SEQUENCE {
    cs-FallbackIndicator                  BOOLEAN,
    purpose                               CHOICE{
        handover                          Handover,
        cellChangeOrder                   CellChangeOrder
    },
    nonCriticalExtension                  MobilityFromEUTRACommand-v8a0-IEs OPTIONAL
}
```

Fig. 15A

```
Handover ::=              SEQUENCE {
    targetRAT-Type            ENUMERATED {
                                  utra, geran, cdma2000-1XRTT, cdma2000-HRPD,
                                  ngutra, spare3, spare2, spare1, ...},
    targetRAT-MessageContainer    OCTET STRING,
    nas-SecurityParamFromEUTRA    OCTET STRING (SIZE (1))    OPTIONAL,    -- Cond OTHERRAN
    systemInformation             SI-OrPSI-GERAN                OPTIONAL     -- Cond PSHO
}

-- ASN1STOP
```

Fig. 15B

HANDOVER REQUIRED message

| IE/Groupe Name | Presence | Range | Semantics description |
|---|---|---|---|
| Message Type | M | | |
| MME UE S1AP ID | M | | |
| eNB UE S1AP ID | M | | |
| Handover Type | M | | "LTE to NR" |
| Cause | M | | |
| Target ID | M | | |
| Direct Forwarding Path Availability | O | | |
| SRVCC HO Indication | O | | |
| Source to Target Transparent Container | M | | "Source NR NB to Target NR NB Transparent Container". Transparent to MME and NG Core (CPF), from eNB to NR NB |
| Source to Target Transparent Container Secondary | O | | |
| .... | | | |
| PS Service Not Available | O | | |

Fig. 16

HANDOVER REQUIRED message

| IE/Groupe Name | Presence | Range | Semantics description |
|---|---|---|---|
| Message Type | M | | |
| CCNF UE NG2AP ID | M | | |
| eNB UE NG2AP ID | M | | |
| Handover Type | M | | "LTE to NR" |
| Cause | M | | |
| Target ID | M | | |
| Direct Forwarding Path Availability | O | | |
| SRVCC HO Indication | O | | |
| Source to Target Transparent Container | M | | "Source NR NB to Target NR NB Transparent Container". Transparent to MME and NG Core (CPF), from eNB to NR NB |
| Source to Target Transparent Container Secondary | O | | |
| …… | | | |
| PS Service Not Available | O | | |

Fig. 17

Source NR NB to Target NR NB Transparent Container

| IE/Groupe Name | Presence | Range | Semantics description/ Note |
|---|---|---|---|
| RRC Container | M | | Includes the RRC Handover Preparation Information message as defined in NR RRC |
| NG-RABs Information List | | 0..1 | |
| >NG-RABs Information Item | | 1..<maxnoof NG-RABs> | |
| >>NG-RAB ID | M | | |
| >>DL Forwarding | O | | |
| Target Cell ID | M | | CGI of NG RAN (NG-UTRAN) |
| Subscriber Profile ID for RAT/Frequency priority | O | | |
| UE Histroy Information | M | | |
| Mobility Information | O | | |
| UE Histroy Information from the UE | O | | |

Fig. 18

Source NR NB to Target NR NB Transparent Container

| IE/Groupe Name | Presence | Range | Semantics description/ Note |
|---|---|---|---|
| RRC Container | M | | Includes the RRC Handover Preparation Information message as defined in NR RRC |
| NG-RABs Information List | | 0..1 | |
| >NG-RABs Information Item | | 1..<maxnoof NG-RABs> | |
| >>NG-RAB ID | M | | |
| >>DL Forwarding | O | | |
| >>Flows Information List | | 1 | |
| >>>Flows Information Item | | 1..<maxnoof Flows> | |
| >>>>Flow ID | M | | |
| Target Cell ID | M | | CGI of NG RAN (NR) |
| .... | | | |

Fig. 19

Source NR NB to Target NR NB Transparent Container

| IE/Groupe Name | Presence | Range | Semantics description/ Note |
|---|---|---|---|
| RRC Container | M | | Includes the RRC Handover Preparation Information message as defined in NR RRC |
| Sessions Information List | | 0..1 | |
| >PDU Sessions Information List | | 0..1 | |
| >>PDU Session ID Information Item | | 1..<maxnoof PDUsessions> | |
| >>>PDU Session ID | M | | |
| >>>DL Forwarding | O | | |
| >NG-RABs Information List | | 0..1 | |
| >>NG-RABs Information Item | | 1..<maxnoof E-RABs> | |
| >>>NG-RAB ID | M | | |
| >>>DL Forwarding | O | | |
| Target Cell ID | M | | CGI of NG RAN (NG-UTRAN) |
| ... | | | |

Fig. 20

HANDOVER REQUEST message

| IE/Groupe Name | Presence | Range | Semantics description/ Note |
| --- | --- | --- | --- |
| Message Type | M | | |
| CCNF UE NG2AP ID | M | | UE ID used in NG2 for SM and/or MM |
| Handover Type | M | | "LTE to NR" |
| Cause | M | | |
| UE Aggregate Maximum Bit Rate | M | | |
| NG-RABs To Be Setup List | M | 1 | |
| >NG-RABs To Be Setup Item IEs | | 1..<maxnoof NG-RABs> | |
| >>NG-RAB ID | M | | |
| >>Transport Layer Address | M | | |
| >>GTP-TEID | M | | To Deliver Uplink PDUs. |
| >>NG-RAB Level QoS Parameters | M | | Inculudes necessaray QoS parameters. |
| >>Data Forwarding Not Possible | O | | |
| Source to Target Transparent Container | M | | "Source NR NB to Target NR NB Transparent Container". |
| UE Security Capabilities | M | | |
| ... | | | |
| Security Context | M | | Next-Hop Chaining Count, Next-Hop NH |
| NAS Security Parameters to NG-UTRAN | C-iffrom EUTRAN | | The NR NB shall use this IE as specified in TS 33.401 |
| ... | | | |
| ProSe Authorized | O | | |

Fig. 21

HANDOVER REQUEST message

| IE/Groupe Name | Presence | Range | Semantics description/ Note |
|---|---|---|---|
| ... | | | |
| NG-RABs To Be Setup List | | 1 | |
| >NG-RABs To Be Setup Item IEs | | 1..<maxnoof NG-RABs> | |
| >>NG-RAB ID | M | | |
| >>Flows Information List | | 0..1 | |
| >>>Flows Information Item | | 1..<maxnoof Flows> | |
| >>>>Flow ID | M | | |
| >>Transport Layer Address | M | | To Deliver Uplink PDUs. |
| >>GTP-TEID | M | | To Deliver Uplink PDUs. |
| >>NG-RAB Level QoS Parameters | M | | Incudes necessaray QoS parameters. |
| >>Data Forwarding Not Possible | O | | |
| ... | | | |

Fig. 22

HANDOVER REQUEST message

| IE/Groupe Name | Presence | Range | Semantics description/ Note |
|---|---|---|---|
| ... | | | |
| Session To Be Setup List | | 1 | |
| >PDU Sessions Information List | | 0..1 | |
| >>PDU Session ID Information Item | | 1..<maxnoof PDUsessions> | |
| >>>PDU Session ID | M | | |
| >>>Transport Layer Address | M | | |
| >>>Session Endpoint ID | M | | GTP-TEID, GRE-TEID, or NF ID |
| >>>Slice Information | M | | |
| >>>PDU Session Level QoS Parameters | M | | |
| >>>Data Forwarding Not Possible | O | | |
| >NG-RABs To Be Setup List | | 0..1 | |
| >>NG-RABs To Be Setup Item IEs | | 1..<maxnoof NG-RABs> | |
| >>>NG-RAB ID | M | | |
| >>>Transport Layer Address | M | | |
| >>>GTP-TEID | M | | To Deliver Uplink PDUs. |
| >>>NG-RAB Level QoS Parameters | M | | Inculudes necessaray QoS parameters. |
| >>>Data Forwarding Not Possible | O | | |
| ... | | | |

Fig. 23

Slice Information

| IE/Groupe Name | Presence | Range | Semantics description/ Note |
|---|---|---|---|
| Slice Information | | | |
| >Network Slice Instance ID | M | | |
| >Network Function ID | M | | One or some of DCN ID, SCNF ID, SUNF ID, CPF ID, UPF ID, Gateway ID, DNN, etc. If some, maybe "Network Function ID List". |
| >Multi-Dimensional Descriptor | O | | |
| >>Slice Type | M | | E.g., Service Category, Use case{eMBB, URLLC, mMTC}, ... |
| >>Tenant ID | M | | E.g., Use case, Subscription group{home, roaming}, ... |
| >Mobility Class | O | {high mobility, low mobility, No mobility, ...} | |
| >Session Class | O | {Session pre-setup, Session post-setup, No PDU session, ...} | |

Fig. 24

Session Endpoint ID

| IE/Groupe Name | Presence | Range | Semantics description/ Note |
|---|---|---|---|
| CHOICE Session Endpoint ID | M | | |
| >GTP | | | |
| >>GTP-TEID | M | | |
| >GRE | | | |
| >>GRE-TEID | M | | |
| >UP Network Function ID | | | |
| >>Network Function ID | M | | One or some of DCN ID, CUNF ID, SUNF ID, UPF ID, Gateway ID, DNN, TUPF ID, etc. If more than one, "UP Network Function ID List" used. |

Fig. 25

HANDOVER REQUEST ACKNOWLEDGE message

| IE/Groupe Name | Presence | Range | Semantics description/ Note |
|---|---|---|---|
| Message Type | M | | |
| CCNF UE NG2AP ID | M | | |
| NR NB UE NG2AP ID | M | | Allocated at the target NR NB (gNB) |
| NG-RABs Admitted List | | 1 | |
| >NG-RABs Admitted Item IEs | | 1..<maxnoof NG-RABs> | |
| >>NG-RAB ID | M | | |
| >>Transport Layer Address | M | | |
| >>GTP-TEID | M | | To Deliver DLPDUs. |
| >>DL Transport Layer Address | O | | |
| >>DL GTP-TEID | O | | To deliver forwarded DL PDCP SDUs. |
| >>UL Transport Layer Address | O | | |
| >>UL GTP-TEID | O | | To deliver forwarded UL PDCP SDUs. |
| NG-RABs Failed to Setup List | O | | A value for *NG-RAB ID* shall only be present once in *NG-RABs Admitted List* IE and *NG-RABs Failed to Setup List* IE. |
| Target to Source Transparent Container | M | | "Target NR NB to Source NR NB Transparent Container". |
| ... | | | |

Fig. 26

Target NR NB to Source NR NB Transparent Container

| IE/Groupe Name | Presence | Range | IE type and reference | Semantics description/ Note |
|---|---|---|---|---|
| RRC Container | M | | OCTET STRING | Includes the RRC NG-UTRA Handover Command message as defined in NR RRC |

Fig. 27

HANDOVER REQUEST ACKNOWLEDGE message

| IE/Groupe Name | Presence | Range | Semantics description/ Note |
|---|---|---|---|
| ... | | | |
| NG-RABs Admitted List | | 1 | |
| >NG-RABs Admitted Item IEs | | 1..\<maxnoof NG-RABs\> | |
| >>NG-RAB ID | M | | |
| >>Flows Information List | | 0..1 | |
| >>>Flows Information Item | | 1..\<maxnoof Flows\> | |
| >>>>Flow ID | M | | |
| >>Transport Layer Address | M | | |
| >>GTP-TEID | M | | |
| NG-RABs Failed to Setup List | O | | A value for *NG-RAB ID* shall only be present once in *NG-RABs Admitted List* IE and *NG-RABs Failed to Setup List* IE. |
| ... | | | |

Fig. 28

HANDOVER REQUEST ACKNOWLEDGE message

| IE/Groupe Name | Presence | Range | Semantics description/ Note |
|---|---|---|---|
| ... | | | |
| Session Admitted List | | | |
| >PDU Sessions Admitted Item IEs | | 0..1 1..<maxnoof PDUsessions> | |
| >>PDU Session ID | M | | |
| >>Transport Layer Address | M | | |
| >>Session Endpoint ID | M | | |
| >>Forwarding Address | O | | |
| >NG-RABs Admitted Item IEs | | 0..1 1..<maxnoof NG-RABs> | |
| >>NG-RAB ID | M | | |
| >>Transport Layer Address | M | | |
| >>GTP-TEID | M | | |
| ... | O | | |
| PDU Sessions Failed to Setup List | O | | A value for *PDU Session ID* shall only be present once in *PDU Sessions Admitted List* IE and *PDU Sessions Failed to Setup List* IE. |
| NG-RABs Failed to Setup List | O | | A value for *NG-RAB ID* shall only be present once in *NG-RABs Admitted List* IE and *NG-RABs Failed to Setup List* IE. |
| ... | | | |

Fig. 29

Forwarding Address

| IE/Groupe Name | Presence | Range | Semantics description/ Note |
|---|---|---|---|
| Forwarding Address | | | |
| >DL Transport Layer Address | O | | |
| >DL Session Endpoint ID | O | | Refer to "Session Endpoint ID" To deliver forwarded DL PDCP SDUs. |
| >UL Transport Layer Address | O | | |
| >UL Session Endpoint ID | O | | Refer to "Session Endpoint ID" To deliver forwarded UL PDCP SDUs. |

Fig. 30

HANDOVER COMMAND message

| IE/Groupe Name | Presence | Range | Semantics description/ Note |
|---|---|---|---|
| Message Type | M | | |
| MME UE S1AP ID | M | | |
| eNB UE S1AP ID | M | | |
| Handover Type | M | | |
| NAS Security Parameters from E-UTRAN | C-ifto OTHERRAN | | The eNB shall use this IE as specified in TS 33.401 |
| E-RABs Subject to Forwarding List | | 0..1 | |
| >E-RABs Subject to Forwarding Item IEs | | 1..<maxnoof E-RABs> | |
| >>E-RAB ID | M | | |
| >>DL Transport Layer Address | O | | |
| >>DL GTP-TEID | O | | To deliver forwarded DL PDCP SDUs. |
| >>UL Transport Layer Address | O | | |
| >>UL GTP-TEID | O | | To deliver forwarded UL PDCP SDUs. |
| E-RABs to Release List | | | |
| Target to Source Transparent Container | M | | "Target NR NB to Source NR NB Transparent Container". |
| Target to Source Transparent Container Secondary | O | | |
| Critically Diagnostics | O | | |

Fig. 31

HANDOVER COMMAND message

| IE/Groupe Name | Presence | Range | Semantics description/ Note |
|---|---|---|---|
| Message Type | M | | |
| CCNF UE NG2AP ID | M | | |
| eNB UE NG2AP ID | M | | |
| Handover Type | M | | |
| NAS Security Parameters from E-UTRAN | C-ifto OTHERRAN | | The eNB shall use this IE as specified in TS 33.401 |
| NE-RABs Subject to Forwarding List | | 0..1 | |
| >NE-RABs Subject to Forwarding Item IEs | | 1..<maxnoof NE-RABs> | |
| >>NE-RAB ID | M | | |
| >>DL Transport Layer Address | O | | |
| >>DL GTP-TEID | O | | To deliver forwarded DL PDCP SDUs. |
| >>UL Transport Layer Address | O | | |
| >>UL GTP-TEID | O | | To deliver forwarded UL PDCP SDUs. |
| NE-RABs to Release List | O | | |
| Target to Source Transparent Container | M | | "Target NR NB to Source NR NB Transparent Container". |
| Target to Source Transparent Container Secondary | O | | |
| Critically Diagnostics | O | | |

Fig. 32

RADIO ACCESS NETWORK NODE, RADIO TERMINAL, AND METHOD THEREFOR

CROSS-REFERENCE TO RELATED APPLICATIONS

This application is a continuation application of U.S. patent application Ser. No. 18/211,994 filed on Jun. 20, 2023, which is a continuation application of U.S. patent application Ser. No. 17/712,279 filed on Apr. 4, 2022, which issued as U.S. Pat. No. 11,800,420, which is a continuation application of U.S. patent application Ser. No. 16/321,877 filed on Jan. 30, 2019, which issued as U.S. Pat. No. 11,330,492, which is a National Stage Entry of international application PCT/JP2017/018317 filed on May 16, 2017, which claims the benefit of priority from Japanese Patent Application 2016-158279 filed on Aug. 10, 2016, the disclosures of all of which are incorporated in their entirety by reference herein.

TECHNICAL FIELD

The present disclosure relates to a radio communication system and, in particular, to handover of a radio terminal between different Radio Access Technologies (RATs).

BACKGROUND ART

The 3rd Generation Partnership Project (3GPP) has started to work on the standardization for the fifth generation mobile communication system (5G), i.e., 3GPP Release 14, in 2016 to make 5G a commercial reality in 2020 (see Non-patent Literature 1). 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is also referred to as a Next Generation (NextGen) System (NG System). The new RAT for the NG System is referred to as a New Radio (NR), a 5G RAT, or a NG RAT. A new Radio Access Network (RAN) and a core network for the NG System are referred to as a NextGen RAN (NG RAN) and a NextGen Core (NG Core), respectively. A radio terminal (i.e., User Equipment (UE)) that is connected to the NG System is referred to as NextGen UE (NG UE). Official names for RATs, UEs, radio access networks, core networks, network entities (or nodes), protocol layers, etc. for the NG System will be determined in the future as the standardization work progresses.

The term "LTE" used in this specification includes enhancement/evolution of LTE and LTE-Advanced to provide interworking with the NG System, unless otherwise specified. The enhancement/evolution of LTE and LTE-Advanced for the interworking with the NG System is also referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the NG System, unless otherwise specified. Enhanced EPC, enhanced MME, enhanced S-GW, and enhanced P-GW are also referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN) and a core network (i.e., an Evolved Packet core (EPC)). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. A SDF is one or more packet flows that match an SDF template (i.e., packet filters) based on a Policy and Charging Control (PCC) rule. Further, each packet to be sent through an EPS bearer for packet routing contains information for identifying which bearer (i.e., a General Packet Radio Service (GPRS) Tunneling Protocol (GTP) tunnel) this packet is associated with.

In contrast, with regard to the NG System, it has been suggested that although radio bearers may be used in the NG RAN, no bearers are used in the NG Core or in the interface between the NG RAN and the NG Core (see Non-patent Literature 1). Specifically, PDU flows are defined instead of an EPS bearer, and one or more SDFs are mapped to one or more PDU flows. A PDU flow between an NG UE and a user-plane terminating entity in an NG Core (i.e., an entity corresponding to a P-GW in the EPC) corresponds to an EPS bearer in the EPS Bearer-based QoS concept. That is, the NG System adopts the Flow-based QoS (or per-flow QoS) concept instead of the Bearer-based QoS concept. In the Flow-based QoS concept, QoS is handled per PDU flow. Note that, association between a UE and a data network is referred to as a "PDU session". The term "PDU session" corresponds to the term "PDN connection" in LTE and LTE-Advanced. A plurality of PDU flows can be configured in one PDU session.

In this specification, a system that configures an end-to-end bearer (e.g., an EPS bearer) between a UE and an edge node (e.g., a P-GW) in a core network and adopts the Bearer-based QoS concept, such as the LTE and LTE-Advanced system, is referred to as a "bearer-based system" or a "bearer-based network". In contrast, a system that does not use any bearer in a core network or in an interface between the core network and a RAN and adopts the Flow-based QoS concept, such as the NG system, is referred to as a "bearer-less system" or a "bearer-less network". Similarly to the above-described NG System, radio bearers may be used in a RAN in the bearer-less network. The term "bearer-less" can also be expressed as, for example, GTP-less, (PDN) connection-less, tunnel-less, (IP) flow-based, SDF-based, stream-based, or (PDU) session-based.

Further, it has been suggested that the NG System supports network slicing (see Non-patent Literature 1). The network slicing uses a Network Function Virtualization (NFV) technology and a software-defined networking (SDN) technology and makes it possible to create a plurality of virtualized logical networks on a physical network. Each virtualized logical network is referred to as a network slice or a network slice instance, includes logical nodes and functions, and is used for specific traffic and signaling. The NG RAN or the NG Core or both have a Slice Selection Function (SSF). The SSF selects one or more network slices suitable for an NG UE based on information provided by at least one of this NG UE and the NG Core.

Patent Literature 1 discloses handover from a bearer-less network (e.g., 5G) to a bearer-based network (e.g., LTE) and handover from a bearer-based network (e.g., LTE) to a bearer-less network (e.g., 5G). In the handover from 5G to LTE disclosed in Patent Literature 1, a source control node (i.e., an Access Control Server (ACS)/eMME) in the 5G core (or NG Core) maps QoS parameters of service flows in the bearer-less network (i.e., 5G) to EPS-bearer-level QoS in the bearer-based network (i.e., LTE). The 5G QoS parameters of the service flows are, for example, DiffServ code point (DSCP) values. The EPS-bearer-level QoS in LTE is, for example, a QoS class identifier (QCI) and an allocation and retention priority (ARP). The mapping of DSCP values to EPS bearers may be performed in a one-to-one manner or an n-to-one manner. The source ACS/eMME sends APN information including information about the EPS-bearer-level QoS to a target MME. The target MME sets up GTP tunnels for the UE according to the received APN information.

Further, in the handover from LTE to 5G disclosed in Patent Literature 1, a source MME in the LTE core (i.e., the EPC) sends a forward relocation request containing necessary bearer context information to a target ACS/eMME in the 5G core (the NG Core). The target ACS/eMME performs mapping of QCI values received from the LTE (i.e., the source MME) to 5G QoS parameters (i.e., DSCP values) and supplies them to a transfer node (i.e., a Mobility Gateway Access Router (M-GW/AR) or a Mobility Gateway Edge Router (M-GW/ER)) in the 5G core (or NG Core). By doing so, the Target ACS/eMME sets up at least one Generic Routing Encapsulation (GRE) tunnel for transferring service flows (i.e., IP packets) of the UE.

CITATION LIST

Patent Literature

Patent Literature 1: International Patent Publication No. WO2015/160329

Non Patent Literature

Non-patent Literature 1: 3GPP TR 23.799 V0.6.0 (2016-07) "3rd Generation Partnership Project; Technical Specification Group Services and System Aspects; Study on Architecture for Next Generation System (Release 14)", July 2016

SUMMARY OF INVENTION

Technical Problem

The inventors have studied handovers between a bearer-based network (e.g., LTE) and a bearer-less network (e.g., 5G), and found several problems. For example, Patent Literature 1 discloses that, in a handover from a bearer-based network (e.g., LTE) to a bearer-less network (e.g., 5G), a target ACS/eMME in a 5G core (NG Core) maps QCI values acquired from the LTE (i.e., a source MME) onto 5G QoS parameters (i.e., DSCP values) and provides them to a transfer node (i.e., Mobility Gateway Access Router (M-GW/AR) or Mobility Gateway Edge Router (M-GW/ER)) in the 5G core (NG Core). However, Patent Literature 1 does not describe details of processes (in particular, processes in the Access Stratum (AS) layer) that are performed by a UE, a source eNodeB (eNB) in an E-UTRAN, and a target 5G Access Point (AP) in a 5G RAN (NG RAN) during a handover procedure from LTE to 5G.

Accordingly, one of the objects to be attained by embodiments disclosed herein is to provide an apparatus, a method, and a program that contribute to appropriately configuring an AS layer of a target RAT in a handover between a bearer-based network (e.g., LTE) and a bearer-less network (e.g., 5G). It should be noted that the above-described object is merely one of the objects to be attained by the embodiments disclosed herein. Other objects or problems and novel features will be made apparent from the following description and the accompanying drawings.

Solution to Problem

In an aspect, a target radio access network (RAN) node associated with a bearer-less network includes at least one memory and at least one processor coupled to the at least one memory. The at least one processor is configured to receive, from a core network, a handover request message requesting a handover of a radio terminal from a bearer-based network to the bearer-less network. The handover request message includes flow information related to at least one session to be established in the bearer-less network in order to transfer at least one packet flow of the radio terminal. The at least one processor is further configured to send to the core network, in response to the handover request message, a handover request acknowledge message containing a Target to Source Transparent Container to the core network in response to the handover request message. The Target to Source Transparent Container includes radio resource configuration information derived from the flow information and is to be forwarded to a source RAN node associated with the bearer-based network through the core network.

In an aspect, a source radio access network (RAN) node associated with a bearer-based network includes at least one memory and at least one processor coupled to the at least one memory. The at least one processor is configured to send, to a core network, a handover required message for starting a handover of a radio terminal from the bearer-based network to a bearer-less network, and receive a handover command message containing a Target to Source Transparent Container from the core network. The Target to Source Transparent Container is generated by a target RAN node associated with the bearer-less network and includes radio resource configuration information needed by the radio terminal to establish a radio connection associated with at least one session to be established in the bearer-less network in order to transfer at least one packet flow of the radio terminal. The at least one processor is further configured to transmit, to the radio terminal, a mobility command message containing the radio resource configuration information and indicating a handover to the bearer-less network.

In an aspect, a radio terminal includes at least one memory and at least one processor coupled to the at least one memory. The at least one processor is configured to receive, from a radio access network (RAN) node associated with a bearer-based network, a mobility command message indicating a handover from the bearer-based network to a bearer-less network. The mobility command message is generated by a target RAN node associated with the bearer-less network and contains radio resource configuration information needed by the radio terminal to establish a radio connection associated with at least one session to be established in the bearer-less network in order to transfer at least one packet flow of the radio terminal. The at least one processor is further configured to establish the radio connection with the target RAN node associated with the bearer-less network by using the radio resource configuration information.

In an aspect, a method in a target radio access network (RAN) node associated with a bearer-less network includes:
  receiving, from a core network, a handover request message requesting a handover of a radio terminal from a bearer-based network to the bearer-less network, the handover request message including flow information related to at least one session to be established in the bearer-less network in order to transfer at least one packet flow of the radio terminal; and
  sending to the core network, in response to the handover request message, a handover request acknowledge message containing a Target to Source Transparent Container, the Target to Source Transparent Container including radio resource configuration information derived from the flow information, the Target to Source Transparent Container being to be forwarded to a source RAN node associated with the bearer-based network through the core network.

In an aspect, a method in a source radio access network (RAN) node associated with a bearer-based network includes:
  sending, to a core network, a handover required message for starting a handover of a radio terminal from the bearer-based network to a bearer-less network;
  receiving a handover command message containing a Target to Source Transparent Container from the core network, the Target to Source Transparent Container being generated by a target RAN node associated with the bearer-less network and including radio resource configuration information needed by the radio terminal to establish a radio connection associated with at least one session to be established in the bearer-less network in order to transfer at least one packet flow of the radio terminal; and
  transmitting, to the radio terminal, a mobility command message containing the radio resource configuration information and indicating a handover to the bearer-less network.

In an aspect, a method in a radio terminal includes:
  receiving, from a radio access network (RAN) node associated with a bearer-based network, a mobility command message indicating a handover from the bearer-based network to a bearer-less network, the mobility command message being generated by a target RAN node associated with the bearer-less network and including radio resource configuration information needed by the radio terminal to establish a radio connection associated with at least one session to be established in the bearer-less network in order to transfer at least one packet flow of the radio terminal; and
  establishing the radio connection with the target RAN node associated with the bearer-less network by using the radio resource configuration information.

In an aspect, a program includes a set of instructions (software codes) that, when loaded into a computer, causes the computer to perform a method according to the above-described aspects.

Advantageous Effects of Invention

According to the above-described aspects, it is possible to provide an apparatus, a method, and a program that contribute to appropriately configuring an AS layer of a target RAT in a handover between a bearer-based network (e.g., LTE) and a bearer-less network (e.g., 5G).

BRIEF DESCRIPTION OF DRAWINGS

FIG. 15A shows an example of a format of a Mobility from EUTRA command message;

FIG. 15B shows an example of the format of the Mobility from EUTRA command message;

FIG. 16 shows an example of the format of a Handover Required message;

FIG. 17 shows an example of a format of a Source NR NB to Target NR NB Transparent Container;

FIG. 18 shows an example of a format of a Source NR NB to Target NR NB Transparent Container;

FIG. 19 shows an example of a format of a Source NR NB to Target NR NB Transparent Container;

FIG. 20 shows an example of a format of a Source NR NB to Target NR NB Transparent Container;

FIG. 21 shows an example of a format of a (NR) Handover Request message;

FIG. 22 shows an example of a format of a (NR) Handover Request message;

FIG. 23 shows an example of a format of a (NR) Handover Request message;

FIG. 24 shows an example of a format of Slice Information;

FIG. 25 shows an example of a format of a session endpoint ID;

FIG. 26 shows an example of a format of a (NR) Handover Request Acknowledge message;

FIG. 27 shows an example of a format of a Target to Source Transparent Container;

FIG. 28 shows an example of a format of (NR) Handover Request Acknowledge;

FIG. 29 shows an example of a format of (NR) Handover Request Acknowledge;

FIG. 30 shows an example of a format of a Forwarding Address;

FIG. 31 shows an example of a format of an S1AP Handover Command message; and

FIG. 32 shows an example of a format of an NG2AP Handover Command message.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

First Embodiment

Figure 1:
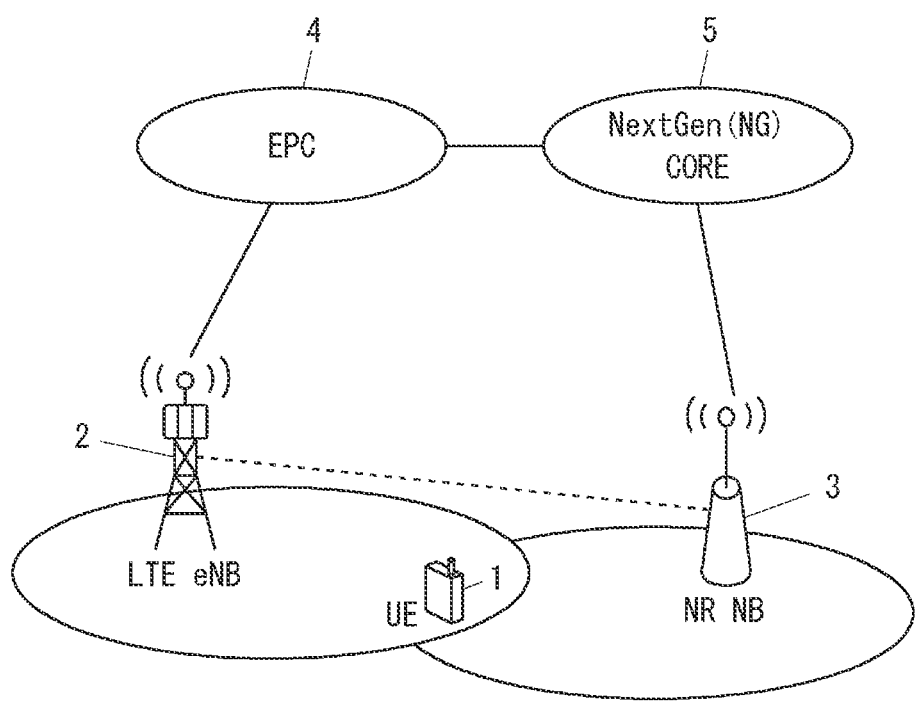
FIG. 1 shows a configuration example of a radio communication network according to some embodiments.

FIG. 1 shows a configuration example of a radio communication network according to some embodiments including this embodiment. In the example shown in FIG. 1, the radio communication network includes a radio terminal (UE) 1, an LTE base station (i.e., eNB) 2, a New Radio (NR) base station (i.e., NR NodeB (NR NB)) 3, an EPC 4, and a NextGen (NG) Core 5. The UE 1 has the capability to connect to an LTE system including the LTE eNB 2 and the EPC 4, and has the capability to connect to a NextGen (NG) system including the NR NB 3 and the NG Core 5.

In the example shown in FIG. 1, the EPC 4 is connected to the NG Core 5. Specifically, one or more nodes in the EPC 4 are connected to one or more nodes in the NG Core 5 via control plane interfaces. In some implementations, an MME in the EPC 4 may be connected via a control plane interface to a control node (i.e., a Control Plane Function (CPF) node) that is included in the NG Core 5 and has at least a part of the MME functions. Further, one or more nodes in the EPC 4 may be connected to one or more data nodes (i.e., User Plane Function (UPF) nodes) in the NG Core 5 via user plane interfaces. Each data node (i.e., UPF node) may be a node having at least a part of the S-GW functions. That is, the EPC 4 may be enhanced to perform interworking with the NG System including the NG Core 5 and may be referred to as an eEPC.

Similarly, the NR NB 3 may be connected to one or more CPF nodes in the NG Core 5 via a control plane interface (e.g., NG2 interface). Further, the NR NB 3 may be connected to one or more UPF nodes in the NG Core 5 via a user plane interface (e.g., NG3 interface). Furthermore, the UE 1 may be connected to one or more CPF nodes in the NG Core 5 via a control plane interface (e.g., NG1 interface). The NG1 interface may be defined as a logical interface for transferring NAS-layer information, and transmission of NAS-layer information may be performed through the NG2 interface and through the radio interface (e.g., NG Uu) between the NR NB 3 and the UE 1.

Figure 2:
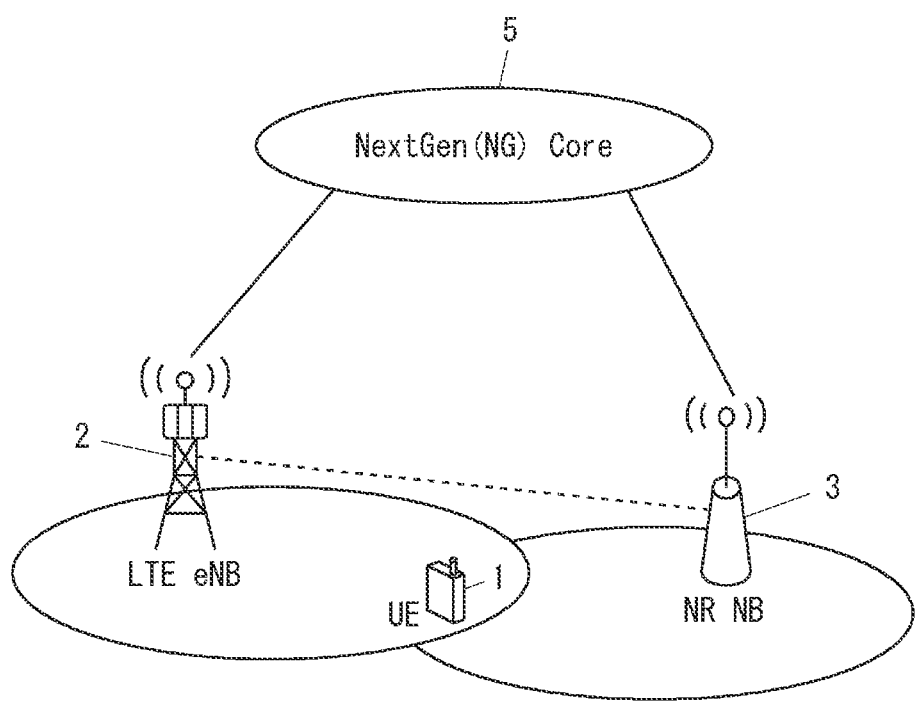
FIG. 2 shows a configuration example of a radio communication network according to some embodiments.

FIG. 2 shows another configuration example of the radio communication network according to some embodiments including this embodiment. In the example shown in FIG. 2, the LTE eNB 2 is connected to the NG Core 5. That is, the LTE eNB 2 is connected to an MME, or a control node having at least a part of the MME functions (i.e., CPF node), in the NG Core 5 through a control plane interface (e.g., NG2 interface). Further, the LTE eNB 2 is connected to a Serving Gateway (S-GW), or a data node having at least a part of the S-GW functions (i.e., UPF node), in the NG Core 5 through a user plane interface (e.g., NG3 interface). As described above, the LTE eNB 2 may be enhanced to be connected to the NG Core 5 and may be referred to as an eLTE eNB. In some implementations, the NG Core 5 may set up a virtualized network slice that provides logical EPC nodes and EPC functions. In some implementations, an E-UTRAN including the LTE eNB 2 may be connected to the same network slice as an NG RAN including the NR NB 3. Alternatively, the E-UTRAN including the LTE eNB 2 may be connected to different network slices.

In the examples shown in FIGS. 1 and 2, the LTE eNB 2 may be connected to the NR NB 3 via a direct inter-base-station interface (e.g., X3 interface). The direct inter-base-station interface may be used for signaling or a user packet transfer or both between the LTE eNB 2 and the NR NB 3. However, the direct inter-base-station interface between the LTE eNB 2 and the NR NB 3 may be omitted.

The NG System may further include other interfaces in addition to the above-described NG1, NG2 and NG3 interfaces. Each interface may be referred to as a reference point. NG RANs (i.e., different NR NBs) may be connected to each other through an NX2 interface. A CPF node having either or both of a Mobility Management Function (MMF) and a Session Management Function (SMF) may be connected to an UPF node through a control plane interface (e.g., NG4 interface). Different UPF nodes may be connected to each other through a user plane interface (e.g., NG9 interface). CPF nodes having different functions may be connected to each other through a control plane interface. For example, a CPF node having an MMF and an SMF may be connected through a control plane interface (e.g., NG7 interface) to a CPF node having a Policy Control Function (PCF). A CPF node having an MMF and an SMF may be connected through a control plane interface (e.g., NG8 interface) to a node having a Subscriber Data Management (SDM) function. A CPF node may be connected through a control plane interface (e.g., NG5 interface) to a node having an Application Function (AF). A UPF node may be connected to an external or local Data Network (DN) through a user plane interface (e.g., NG6 interface). The SMF may include a function of authenticating a user or a terminal and a function of authorizing a service or network slicing. The above-described network nodes are individually or collectively referred to as a Network Function(s) (NF(s)).

The NG System, including the NR NB 3 and the NG Core 5, supports a data transfer based on the above-described Flow-based QoS (or per-flow QoS) concept. The NG System including the NR NB 3 and the NG Core 5 may be further configured to support a bearer-based transfer using a bearer per QoS class and per PDU session. A bearer in the NG System may be configured between a pair of Network Functions (NFs), for example, between the NR NB 3 and a user plane function in the NG Core 5, or between two user plane functions in the NG Core 5. Alternatively, a bearer in the NG System may be configured between the UE 1 and a user plane function in the NG Core 5 through the NR NB 3. A bearer in the NG System may be referred to as an NG-EPS-bearer and a radio access bearer in the NG System may be referred to as an NG-RAB. A bearer in the NG System can be used for transfers of a plurality of packet flows (i.e., PDU flows).

The NG-RAB may be composed of a radio bearer configured between the UE 1 (NG UE) and the NR NB 3 and a bearer configured between the NR NB 3 and a user plane function (e.g., Edge Gateway (Edge GW)) in the NG Core 5 (e.g., NG3 bearer). The NG-EPS-bearer may be composed of the NG-RAB and a core network bearer (e.g., NG9 bearer) configured between user plane functions in the NG Core 5 (e.g., between an Edge GW and a Data Network Gateway (DN GW)). The Edge GW is a gateway to a radio access network and is similar to the user plane function of an LTE S-GW. However, in the NG System, unlike the LTE S-GW, the UE 1 may be connected to a plurality of Edge GWs. The DN GW is a gateway to an external network (i.e., Data Network) and is similar to the user plane function of an LTE P-GW. In the NG System, similarly to the LTE P-GW, the UE 1 may be connected to a plurality of DN GWs.

More specifically, the NG-EPS-bearer may be configured between the UE 1 (i.e., NG UE) and a slice specific user plane function (i.e., Slice specific User plane NF (SUNF)) in the NG Core 5. The NG-RAB may be configured between the UE 1 (i.e., NG UE) and a common user plane function (i.e., Common User plane NF (CUNF)) in the NG Core 5. In this case, the CUNF provides the functions of the Edge GW and the SUNF provides the functions of the DN GW. The CUNF may associate the NG-RAB with a core network bearer (e.g., NG9 bearer). That is, the NG-EPS-bearer may be composed of the NG-RAB between the UE 1 (i.e., NG UE) and the CUNF and the core network bearer (e.g., NG9 bearer) between the CUNF and the SUNF.

The NG System that supports the bearer-based transfer may be further configured to distinguish between data flows (e.g., PDU flows) in a bearer to perform QoS handling (e.g., discard of packets) on a per-data-flow basis (e.g., on a per-PDU-flow basis). For example, the NR NB 3 may associate a bearer (e.g., NG3 bearer) configured between the NR NB 3 and a user plane function in the NG Core 5 with a radio bearer, perform packet forwarding between this bearer (e.g., NG3 bearer) and the radio bearer, and perform QoS handling (e.g., discard of packets) per data flow (e.g., PDU flow) in this bearer.

Note that when the (e) LTE eNB 2 is connected to the NG Core 5 through an NG2 interface, a radio access bearer corresponding to an LTE EPS Radio Access Bearer (E-RAB) may be defined as an NG EPS Radio Access Bearer (NE-RAB) and a bearer corresponding to an LTE EPS bearer may be defined as an NG EPS bearer (NEPS bearer). The NE-RAB may be composed of a radio bearer configured between the UE 1 and the LTE eNB 2 and a bearer (e.g., NG3 bearer) configured between the LTE eNB 2 and a user plane function (e.g., Edge GW or CUNF) in the NG Core 5. The NEPS bearer may be composed of the NE-RAB and a core network bearer (e.g., NG 9 bearer) configured between user plane functions in the NG Core 5 (e.g., between an Edge GW and a DN GW, or between a CUNF and an SUNF).

The LTE eNB 2 connected to the NG System may be configured to distinguish between data flows (e.g., PDU flows) in a NE-RAB to perform QoS handling (e.g., discard of packets) on a per-data-flow basis (e.g., on a per-PDU-flow basis). For example, the LTE eNB 2 may associate a bearer (e.g., NG3 bearer) configured between the LTE eNB 2 and a user plane function in the NG Core 5 with a radio bearer, perform packet forwarding between this bearer (e.g., NG3 bearer) and the radio bearer, and perform QoS handling (e.g., discard of packets) per data flow (e.g., PDU flow) in this bearer.

Figure 3A:
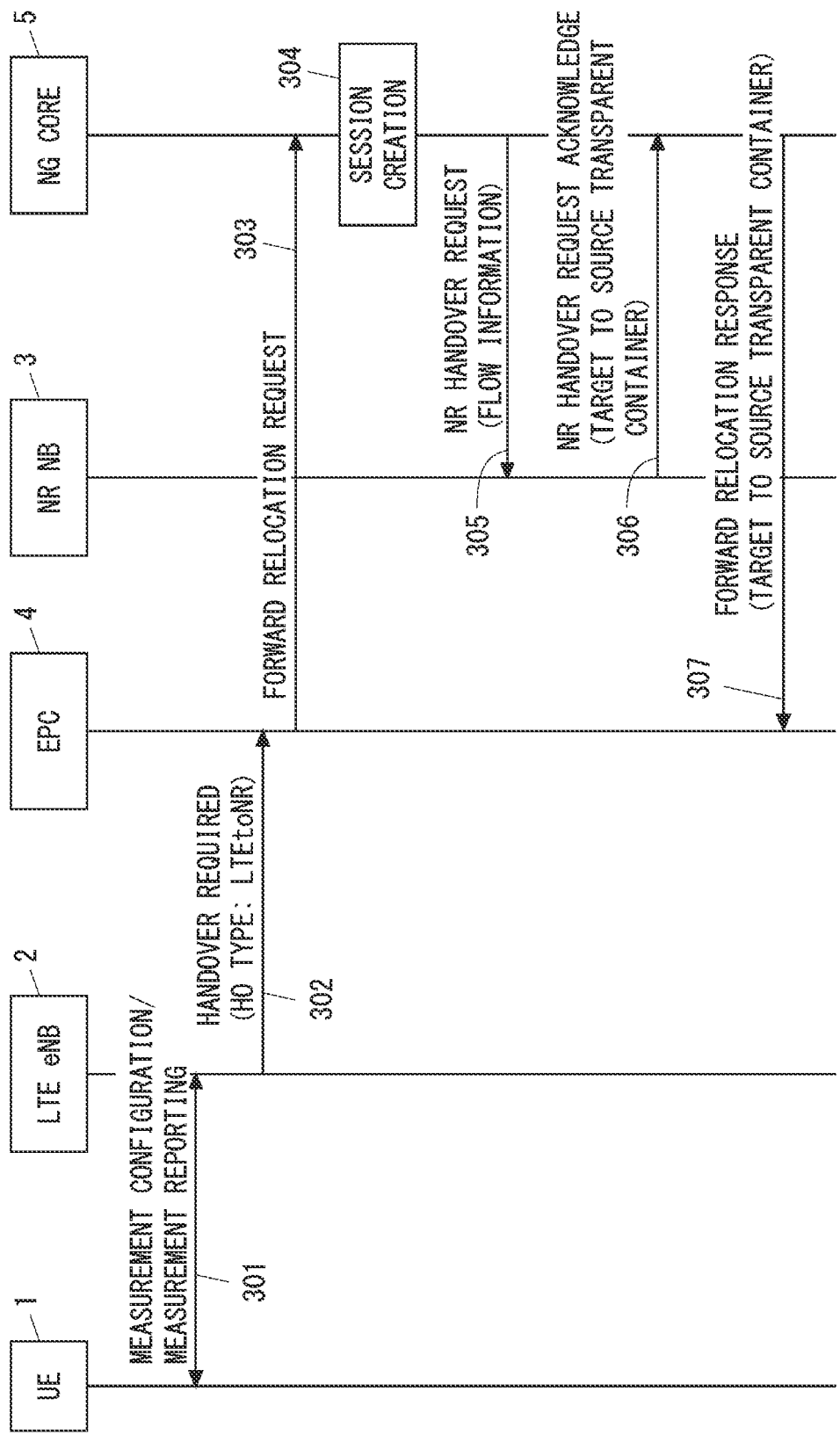
FIG. 3A is a sequence diagram showing an example of an inter-RAT handover procedure from an LTE System to an NG System according to a first embodiment.
Figure 3B:
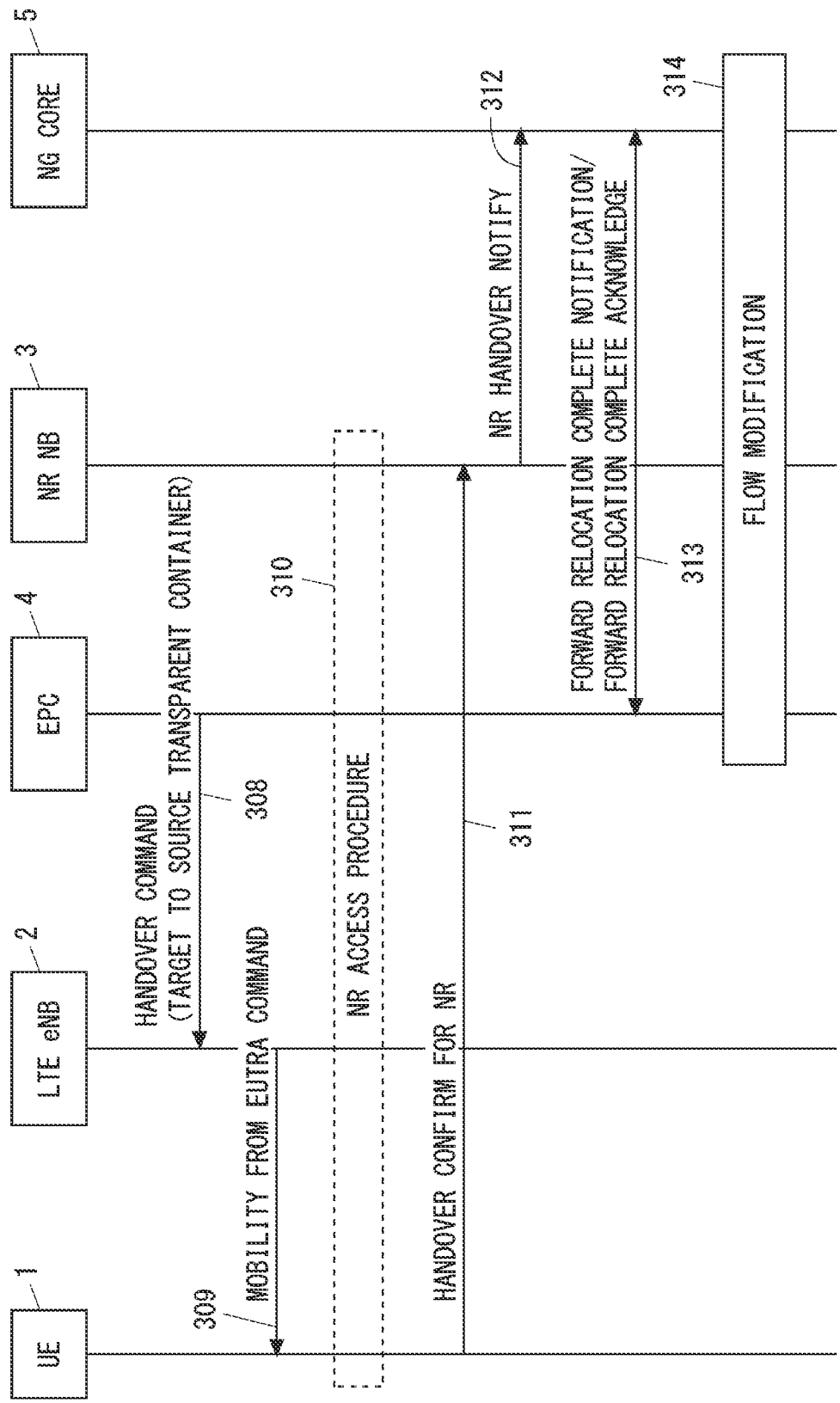
FIG. 3B is a sequence diagram showing the example of the inter-RAT handover procedure from the LTE System to the NG System according to the first embodiment.

This embodiment provides a method for handing over the UE 1 from an LTE System (i.e., a bearer-based network) to an NG System (i.e., a bearer-less network). FIGS. 3A and 3B show an example of a procedure for handing over the UE 1 from the LTE System to the NG System in the configuration example of the radio communication network shown in FIG. 1. FIG. 3A shows a handover preparation phase, while FIG. 3B shows a handover execution phase.

In the procedure shown in FIGS. 3A and 3B, the source base station (i.e., the LTE eNB 2) starts handover by sending a Handover Required message on an interface (or reference point) between the source base station (i.e., LTE eNB 2) and the core network (i.e., the EPC 4). The procedure shown in FIGS. 3A and 3B may be enhancement/evolution of "E-UTRAN to UTRAN Iu mode Inter RAT handover" in LTE. Alternatively, the procedure shown in FIGS. 3A and 3B may be enhancement/evolution of "S1-based handover" with MME relocation in LTE.

In Step 301, the UE 1 is connected to the LTE eNB 2 and is in a connected state (i.e., RRC_Connected). The UE 1 receives a Measurement Configuration from the LTE eNB 2, performs neighbor cell measurements and inter-Radio-Access-Technology (inter-RAT) measurements including measurements of E-UTRAN (LTE) cells and NG-RAN cells according to the received measurement configuration, and sends a measurement report to the LTE eNB 2. The measurement configuration is contained, for example, in an RRC Connection Reconfiguration message transmitted from the E-UTRAN to the UE.

In Step 302, the LTE eNB 2 determines to perform inter-RAT handover to a cell of the NR NB 3 and sends a Handover Required message to the source control node (i.e., source MME) in the EPC 4. This Handover Required message contains an identifier of the target NR NB 3. Further, the Handover Required message may contain a Handover Type Information Element (IE) indicating that it is handover from LTE to NR. For example, "LTEtoNR" is set in the Handover Type IE. Additionally or alternatively, this Handover Required message may contain a Target NR-NB Identifier Information Element (IE). This Handover Required message may contain a Source to Target Transparent Container IE. This Source to Target Transparent Container IE may include RRC layer information (i.e., RRC container) and may further include information regarding a bearer (e.g., an E-RAB). The RRC layer information (i.e., RRC container) includes, for example, at least a part of the Radio Resource Configuration in the serving cell of the UE 1 managed by the LTE eNB 2, which is needed for the radio resource configuration in the NR NB 3.

In Step 303, the source MME in the EPC 4 determines that the type of the handover is Inter-RAT handover to NR (or an NG System), based on the Handover Type IE or the Target NR-NB Identifier IE contained in the received Handover Required message. The MME in the EPC 4 selects a target control node in the NG Core 5. The target control node is a node having at least a part of the functions of the MME in the EPC 4. The MME in the EPC 4 sends a Forward Relocation Request message to the target control node to start a handover resource allocation procedure. This Forward Relocation Request message contains a Mobility Management (MM) Context and all the PDN connections that are active for the UE 1 in the source system (i.e., the LTE system). Each PDN connection includes an associated APN and a list of EPS Bearer Contexts. The MM Context includes information about an EPS bearer context(s) and security-related information. This Forward Relocation Request message further includes information for identifying one or more service data flows associated with each EPS bearer context (e.g., SDF templates, or Traffic Flow Templates (TFTs)).

In Step 304, the target control node in the NG Core 5 performs a procedure for creating a bearer-less session. Specifically, the target control node determines that the packet transfer node (or gateway) for the UE 1 needs to be relocated and then selects a target transfer node (or gateway) in the NG Core 5. The target transfer node (or gateway) is a node having at least a part of the functions of an S-GW in the EPC 4. The target control node sends a Create Session Request message to the target transfer node (or gateway). This Create Session Request message includes information for identifying one or more service data flows associated with each EPS bearer context (e.g., SDF templates, or Traffic Flow Templates (TFTs)). This information for identifying one or more service data flows is derived from the Forward Relocation Request message, which has been sent from the source MME in the EPC 4 to the target control node in the NG Core 5. The target transfer node (or gateway) allocates its local resources and sends a Create Session Response message to the target control node.

Further, in Step 304, the target control node (e.g., CPF) in the NG Core 5 may determine (or select) a network slice to which the UE 1 is to be connected after the handover. In one example, the target control node (e.g., CPF) in the NG Core 5 may select a network slice for the UE 1 based on the QoS needed for the EPS bearer(s) or the SDF(s) of the UE 1. Additionally or alternatively, the Forward Relocation Request message (Step 303) sent by the source MME in the EPC 4 may further contain network slice assistance information. The network slice assistance information assists the target control node to select, configure, or authorize a network slice. The source MME in the EPC 4 may receive at least a part of the network slice assistance information from the UE 1 and send it to the target control node in the NG Core 5. The target control node in the NG Core 5 may perform creation of the selected network slice instance.

The network slice assistance information may indicate, for example: any one or any combination of: a type of the UE 1 (e.g., Device Type or UE Category); a purpose of access by the UE 1 (e.g., UE Usage Type); a type of a service that the UE 1 desires (e.g., Requested/Preferred Service Type, Multi-Dimensional Descriptor (MDD)); slice information selected by the UE 1 (e.g., Selected Slice Type, Selected Slice Identity (ID), or Selected Network Function (NF) ID); slice information for which the UE 1 has been previously authorized (e.g., Authorized Slice Type, Authorized Slice ID, or Authorized NF ID); and acceptable latency of the UE 1 (e.g., Allowed Latency or Tolerable Latency). The Service Type may indicate, for example, a type of a Use Case, such as broadband communication (e.g., enhanced Mobile Broad Band: eMBB), high-reliable/low-latency communication (e.g., Ultra Reliable and Low Latency Communication: URLLC), M2M communication with a large number of connections (e.g., massive Machine Type Communication: mMTC), or a type similar thereto. The Slice ID may indicate, for example, any one or any combination of: slice instance information (e.g., Network Slice Instance (NSI) ID); dedicated network information (e.g., Dedicated Core Network (DCN) ID); and network domain name information (e.g., Domain Network Name (DNN) ID). The NF ID may indicate, for example, an identifier(s) of any one or any combination of: a common network function (e.g., Common NF (CNF)); a common control plane function (e.g., Common Control plane NF (CCNF)); a common user plane function (e.g., Common User plane NF (CUNF)); and a data gateway (e.g., Data Network Gateway (DN GW)).

In Step 305, the target control node in the NG Core 5 sends an NR Handover Request message to the target NR NB 3. This NR Handover Request message contains Flow Information. The flow information relates to at least one session (i.e., PDU session(s)) established in the bearer-less network (i.e., the NG system) to transfer at least one packet flow (i.e., PDU flow(s)) of the UE 1. In respect of each packet flow (i.e., PDU flow) of the UE 1, the flow information includes: a flow identifier (e.g., PDU flow ID); an address and an uplink (UL) Session Endpoint Identifier (SEID) of a transfer node in the NG Core 5 (e.g., Transport Layer Address); and a flow QoS parameter(s). The session endpoint identifier (SEID) may be, for example, a Tunnel Endpoint Identifier (TEID) or a network function (or node) identifier (NF ID). The TEID may be, for example, a GTP-TEID or a GRE-TEID.

The flow information may further indicate mapping between EPS bearers and PDU Flows for the UE 1. For example, the flow information may indicate one or more SDFs mapped to each EPS bearer of the UE 1 and a flow identifier (e.g., PDU flow ID) assigned to each of these one or more SDFs. The flow information may further include priority information (e.g., priority indicator), flow type information (e.g., flow type indicator), or a Flow Class. The priority information may indicate, for example, a relative priority order among a plurality of flows or an absolute priority order of each flow. The flow type information may indicate, for example, which Use Case or which service the flow corresponds to. Further, the flow class may indicate, for example, one of predefined flow types (e.g., loss-less, delay tolerant, delay sensitive, and mission critical).

Further, the NR Handover Request message in Step 305 may contain slice information. This slice information includes information about at least one of: a network slice that is included in the NG Core 5 and to which the UE 1 is going to connect (or the UE 1 is to be connected) after the handover; a network slice that is included in the NG Core 5 and to which the UE 1 is allowed to connect; and a network slice that is included in the NG Core 5 and to which the UE 1 can connect.

Specifically, the slice information may include identification information of the determined (or selected) slice (i.e., network slice: NS), identification information of a network node (NF), or type information of the slice, or any combination thereof. The slice identification information may be, for example, a Slice ID, an NSI ID, an MDD, a DCN ID, or a DNN, or any combination thereof. The identification information of the network node may include, for example, an NF ID, a CNF ID, a CCNF ID, an SCNF ID, a CUNF ID, an SUNF ID, an UPF ID, or a DN GW ID, or any combination thereof. The slice type information may include, for example, a Slice Type indicating any one or any combination of a Service Type, a Service Category, and a Use Case. Additionally or alternatively, the slice type information may include a Tenant ID indicating a Use Case or a subscription contract (a Subscription Group, e.g., a home UE or a roaming UE). The slice type information may include an MDD that includes a Slice Type and a Tenant ID as its elements. Note that the contents of the above-described slice information may be designated per network slice. Accordingly, when the UE 1 is to be connected simultaneously to a plurality of network slices, the slice information may include plural sets of information items corresponding to the number of network slices to which the UE 1 is to be connected.

The slice information may further include a Mobility Class or a Session Class, or both. The Mobility Class may indicate one of predefined mobility levels (e.g., high mobility, low mobility, and no mobility). For example, the high mobility means that a geographical area in which a network slice supports mobility for the UE 1 (or permits mobility to the UE 1) is larger than that of the low mobility, and a level required for continuity of services (or PDU sessions) during handover is higher. The No mobility means a network slice supports mobility for the UE 1 (or permits mobility to the UE 1) only in a very limited geographic area. The Mobility Class may be designated per UE or may be designated per network slice. The Session Class may indicate one of predefined session types (e.g., Session pre-setup, Session post-setup, and No PDU session). For example, in order to maintain services (or PDU Sessions) during mobility as in the case of the existing handovers, the Session pre-setup may indicate that a PDU session needs to be established before the UE completes the movement to the target (i.e., a cell, a beam, etc.). In contrast, the Session post-setup may indicate that a PDU session may be established after the UE has moved to the target. The Session Class may be designated per PDU session. The Mobility Class and the Session Class may be contained in the Slice Type. In other words, the Slice Type may contain a plurality of attributes including the Mobility Class and the Session Class. Note that the above-described flow information may include a Mobility Class, a Session Class, or both of them.

The slice information may include at least a part of the network slice assistance information. That is, in Step 305, the target control node in the NG Core 5 may include at least a part of the network slice assistance information, which has been received from the source MME in the EPC 4, in the slice information contained in the NR Handover Request message and forward it to the target NR NB 3.

In Step 306, upon receiving the NR Handover Request message containing the flow information, the target NR NB 3 generates a UE context including information about a packet flow(s) (i.e., PDU flow(s)) and a security context and allocates resources. Further, the target NR NB 3 generates, based on the flow information (or derives, from the slice information), radio resource configuration information (e.g., radio parameters) needed by the UE 1 to establish a radio connection (e.g., an RRC connection or a radio bearer) associated with the bearer-less network (i.e., NG System). The radio resource configuration information may include at least one parameter included in the flow information. This radio resource configuration information may include system information (e.g., System Information Block: SIB) regarding a cell (or a mobility area or a beam coverage area) of the target NR NB 3, a common radio resource configuration for UEs (e.g., Common Resource Configuration), or a UE dedicated radio resource configuration (e.g., Dedicated Resource Configuration). The radio resource configuration information may further include information indicating mapping between a bearer (e.g., EPS bearer or Data Radio Bearer (DRB)) in a cell of the source LTE eNB 2 and a flow (e.g., PDU flow) to be established in a cell of the target NR NB 3.

Then, the target NR NB 3 sends an NR Handover Request Acknowledge message containing a Target to Source Transparent Container to the target control node. This Target to Source Transparent Container contains the radio resource configuration information generated by the target NR NB 3. As described later, this Target to Source Transparent Container is forwarded through the core networks (i.e., the EPC 4 and the NG Core 5) to the source LTE eNB 2.

Further, in Step 306, the target NR NB 3 may perform admission control based on the NR Handover Request message containing the slice information. For example, the target NR NB 3 may determine whether to accept a bearer or a flow on a per-bearer basis or a per-flow basis. Additionally or alternatively, the target NR NB 3 may perform, based on the slice information, admission control per network slice to which the UE 1 is to be connected. In this process, the NR NB 3 may determine whether it can accept each network slice. When there is a network slice that the NR NB 3 cannot accept (or does not accept), the NR NB 3 may map this network slice to a specific network slice (e.g., default network slice) or connect this network slice to a specific NF (e.g., CUPF). Alternatively, the NR NB 3 may determine that it has failed in accepting this network slice.

In Step 306, when generating the UE context and the radio resource configuration information (e.g., radio parameters), the target NR NB 3 may take account of the slice information contained in the NR Handover Request message.

The radio resource configuration information derived from the slice information may include a radio (or RAN) parameter(s) per network slice (or per use case). The use cases include, for example, an enhanced mobile broadband (eMBB), massive machine-type communications (mMTC), and Ultra-reliable and low-latency communications (URLLC). The radio parameter(s) per network slice (or per use case) may be fundamental physical channel parameters or fundamental layer 2/layer 3 (L2/L3) configurations. The fundamental physical channel parameters may include, for example, a frame/subframe structure, a Transmission Time Interval (TTI) length, subcarrier spacing, and a Physical Random Access Channel (PRACH) resource. The PRACH resource may be either or both of a preamble index and time/frequency resources. The fundamental L2/L3 configurations may include, for example, a frame/subframe pattern and configurations of the L2 protocol sublayers (L2 configuration, e.g., PDCP config, RLC config, or MAC config).

Additionally or alternatively, in signaling of the RRC layer to specify (or indicate) the radio resource configuration information derived from the slice information, at least one of a message structure, a format for an information element (IE), a parameter value, and objects to be encoded and decoded in accordance with ASN.1 (Abstract Syntax Notation One) that defines information structures may be different per slice.

In Step 307, the target control node in the NG Core 5 sends a Forward Relocation Response message containing the Target to Source Transparent Container to the source MME in the EPC 4. The Forward Relocation Response message may further include addresses and a TEID assigned for downlink data forwarding. When indirect downlink forwarding is used, these addresses and TEID may be addresses and a TEID to the S-GW in the EPC 4. When direct downlink forwarding is used, these addresses and TEID may be addresses and a TEID to the target NR NB 3.

In Step 308, the source MME sends a Handover Command message containing the Target to Source Transparent Container to the source LTE eNB 2. The Handover Command message may further contain a list of bearers that are subject to downlink data forwarding (e.g., bearers subject to data forwarding list). The "Bearers Subject to Data forwarding list" IE includes, for example, an address(es) and a TEID(s) for user traffic data forwarding, and an identifier(s) of a flow(s) (e.g., PDU flow(s)) that is subject to data forwarding. The source LTE eNB 2 starts data forwarding for the bearer(s) or the flow(s) (e.g., PDU flow(s)) designated by the "Bearers Subject to Data forwarding list" IE.

In Step 309, the source LTE eNB 2 sends a Radio Resource Control (RRC) message containing the Handover Command message to the UE 1. This Handover Command message includes a transparent container containing the radio resource configuration information that has been set up by the target NR NB 3 in the preparation phase. This RRC message may be, for example, a Mobility from EUTRA command message or an RRC Connection Reconfiguration message.

In Step 310, upon receiving the RRC message containing the Handover Command message, the UE 1 moves to the target RAN (i.e., NG RAN) and performs handover according to the radio resource configuration information provided by the Handover Command message. That is, the UE 1 establishes a radio connection with the target NR NB 3 associated with the bearer-less network (i.e., NG System). In Step 311, the UE 1 sends a Handover Confirm for NR message to the target NR NB 3 after it has successfully synchronized to the target cell. The message in Step 311 may be an NR RRC Connection Reconfiguration Complete message.

In Step 312, when the UE 1 has successfully accessed the target NR NB 3, the target NR NB 3 informs the target control node in the NG Core 5 about that by sending an NR Handover Notify message.

In Step 313, the target control node in the NG Core 5 recognizes that the UE 1 has arrived at the target side and informs the source MME in the EPC 4 about that by sending a Forward Relocation Complete Notification message. The source MME sends a Forward Relocation Complete Acknowledge message to the target control node.

In Step 314, the target control node in the NG Core 5 performs a flow modification procedure and thereby completes the Inter-RAT handover procedure. For example, the target control node may send a Modify Flow Request message per session (i.e., per PDU session) to a transfer node in the NG Core 5. This Modify Flow Request message may contain a flow identifier (e.g., PDU flow ID), and also contain an address and a downlink (DL) session endpoint identifier (SEID) of the target NR NB 3. The session endpoint identifier (SEID) may be, for example, a Tunnel Endpoint Identifier (TEID). The transfer node in the NG Core 5 may communicate with the edge node (i.e., eP-GW) in the EPC 4 to notify the edge node (i.e., (e)P-GW) in the EPC 4 of the relocation of the transfer node or the change of the RAT type due to the inter-RAT HO. Specifically, the transfer node in the NG Core 5 may send a Modify Bearer Request message per session (i.e., per PDN connection) to the edge node in the EPC 4. The edge node in the EPC 4 may send a Modify Bearer Response message to the transfer node in the NG Core 5. The transfer node in the NG Core 5 may send a Modify Flow Response message to the target control node.

After the handover is completed according to the procedure shown in FIGS. 3A and 3B, the paths shown below may be used for the data transfer for the UE 1. When the NG System including the NR NB 3 and the NG Core 5 supports a bearer-based transfer in the NG Core 5 and a bearer (e.g., NG-EPS-bearer) is used for the UE 1 after the handover, both the uplink path and the downlink path may include, for example, a path (e.g., GTP tunnel or GRE tunnel) between the source (or old) S/P-GW and the target (or New) User plane function (e.g., CUNF) in the NG Core 5. Specifically, the S/P-GW may transfer downlink data to the User plane Function (e.g., the CUNF) in the NG Core 5, while the User plane Function (e.g., the CUNF) in the NG Core 5 may transfer uplink data to the S/P-GW.

In contrast, when a bearer (e.g., NG-EPS-bearer) is not used for the UE 1 after the handover, for example, the CUNF may relay between the source (or old) S/P-GW and the target (or New) User plane Function (e.g., SUNF having the NW Slicing function). Specifically, the S/P-GW may transfer downlink data to the CUNF in the NG Core 5 and then the CUNF may transfer downlink data to another UNF having a flow-by-flow control function. Alternatively, data transfer may be performed directly between the S/P-GW and the SUNF without traversing the CUNF. The above-described data transfer paths after the handover may also be used in other handover procedures described below.

Figure 4A:
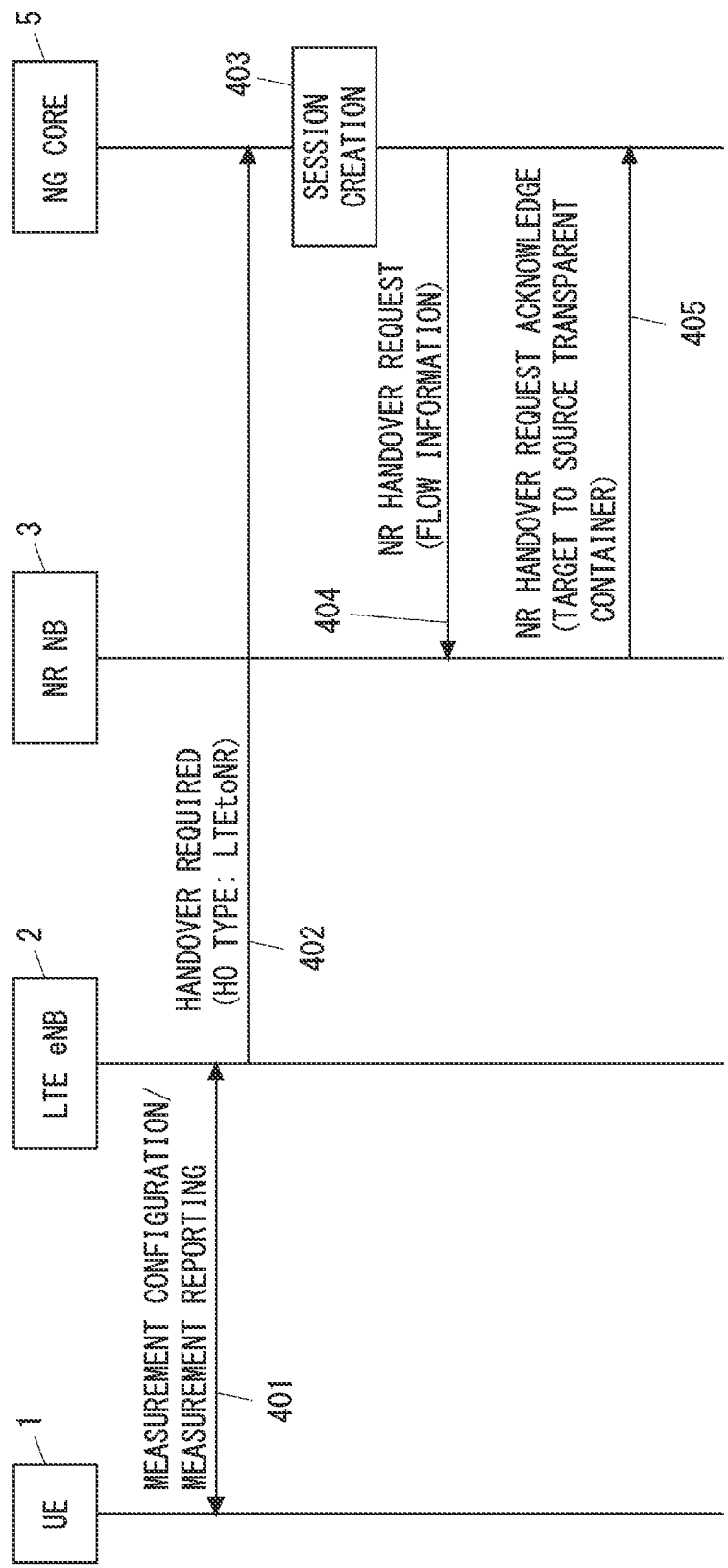
FIG. 4A is a sequence diagram showing another example of the inter-RAT handover procedure from the LTE System to the NG System according to the first embodiment.
Figure 4B:
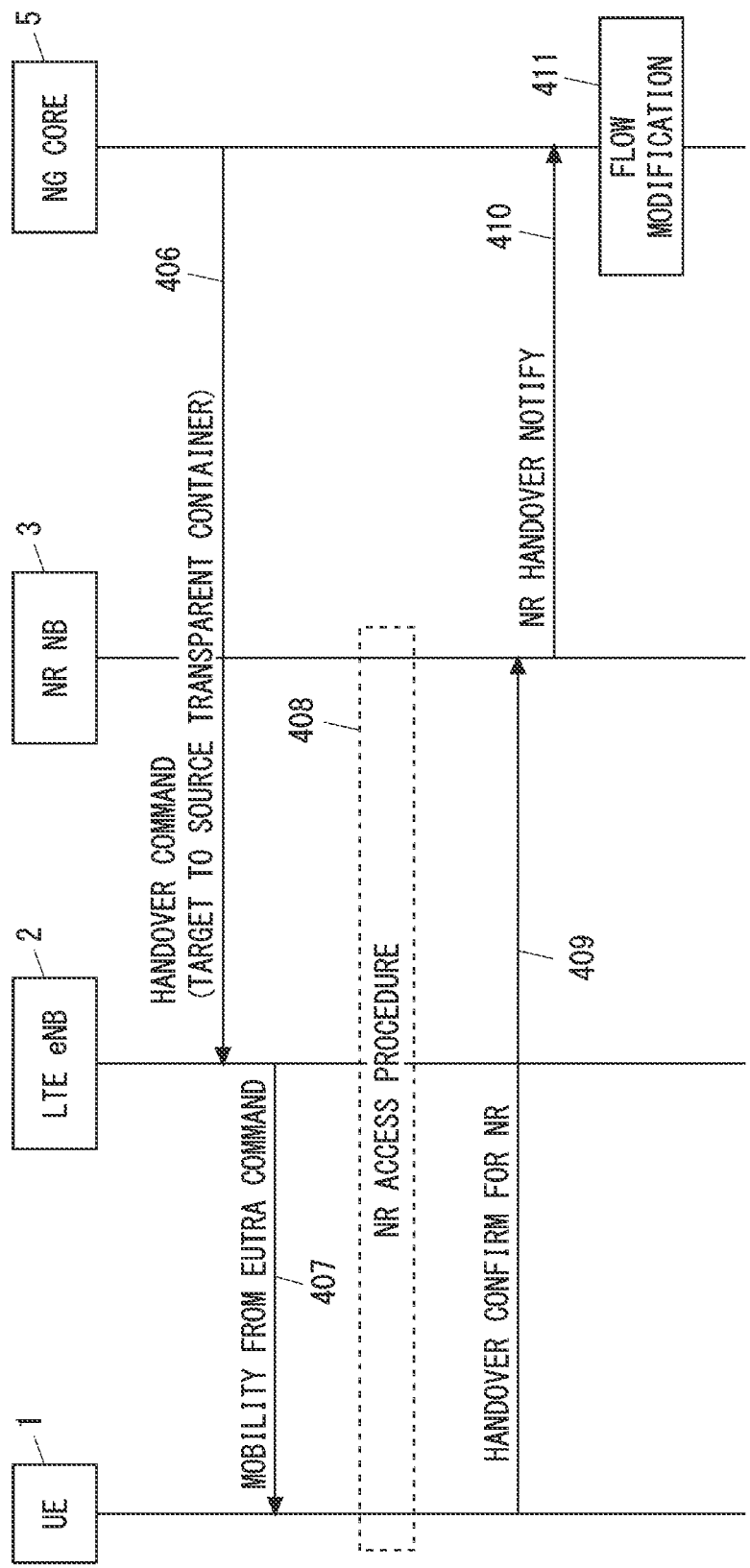
FIG. 4B is a sequence diagram showing the other example of the inter-RAT handover procedure from the LTE System to the NG System according to the first embodiment.

FIGS. 4A and 4B show an example of a procedure for handing over the UE 1 from the LTE System to the NG System in the configuration example of the radio communication network shown in FIG. 2. FIG. 4A shows the handover preparation phase and FIG. 4B shows the handover execution phase.

Similarly to the procedure shown in FIGS. 3A and 3B, in the procedure shown in FIGS. 4A and 4B, the source base station (i.e., LTE eNB 2) starts handover by sending a Handover Required message on an interface between the source base station (i.e., LTE eNB 2) and the core network (i.e., NG Core 5). Similarly to the procedure shown in FIGS. 3A and 3B, the procedure shown in FIGS. 4A and 4B may be enhancement/evolution of "E-UTRAN to UTRAN Iu mode Inter RAT handover" in LTE, or may be enhancement/evolution of "S1-based handover" with MME relocation in LTE.

Processes in steps 401 and 402 in FIG. 4A are similar to those in Steps 301 and 302 of FIG. 3A. However, in Step 402, the LTE eNB 2 sends a Handover Required message to the NG Core 5. As already described, in the network configuration example shown in FIG. 2, the E-UTRAN including the LTE eNB 2 and the NG RAN including the NR NB 3 may be connected to the same network slice. In this implementation, handover of the UE 1 from the LTE eNB 2 to the NR NB 3 is carried out by signaling among one or more logical control nodes (i.e., control plane functions) and one or more logical transfer nodes (i.e., user plane functions) created within the same network slice. In this implementation, the Handover Required message in Step 402 may be sent to a new or enhanced control node corresponding to the MME.

Alternatively, the E-UTRAN including the LTE eNB 2 and the NG RAN including the NR NB 3 may be connected to different network slices. In this implementation, handover of the UE 1 from the LTE eNB 2 to the NR NB 3 is carried out by inter-slice communication between a network slice instance corresponding to an EPC to which the LTE eNB 2 is connected and a network slice instance corresponding to a pure NG Core to which the NR NB 3 is connected. In this implementation, the Handover Required message in Step 402 may be sent to an MME in the network slice instance to which the LTE eNB 2 is connected.

Processes in steps 403 to 405 in FIG. 4A are similar to those in Steps 303 to 307 in FIG. 3A. In the procedure shown in FIG. 4A, illustration of Steps 303 and 307 shown in FIG. 3A is omitted. Processes corresponding to those in Steps 303 and 307 are performed within the NG Core 5.

Processes in steps 406 to 411 in FIG. 4B are similar to those in Steps 308 to 314 in FIG. 3B. In the procedure shown in FIG. 4B, illustration of Step 313 shown in FIG. 3B is omitted. Processes corresponding to those in Step 313 are performed within the NG Core 5.

Figure 5:
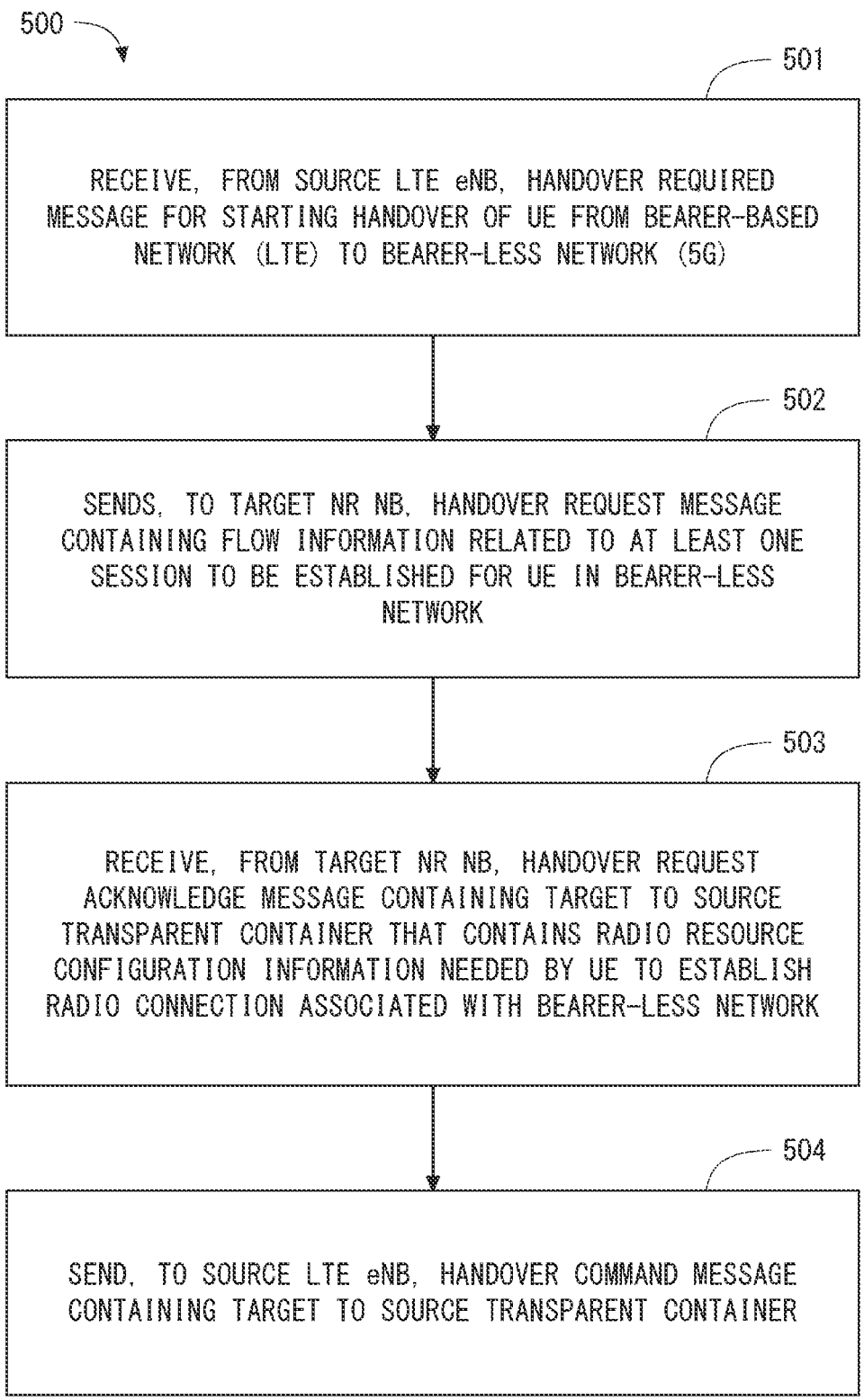
FIG. 5 is a flowchart showing an example of a method performed by a core network according to the first embodiment.

FIG. 5 is a flowchart showing a process 500 that is an example of a method performed by a core network. The core network corresponds to the EPC 4 and the NG Core 5 shown in FIG. 1, or the NG Core 5 shown in FIG. 2. In Step 501, the core network receives, from the source LTE eNB 2, a Handover Required message for starting a handover of the UE 1 from the bearer-based network (LTE) to the bearer-less network (5G). Step 501 corresponds to Step 302 in FIG. 3A or Step 402 in FIG. 4A.

In Step 502, the core network sends, to the target NR NB 3, a (NR) Handover Request message containing flow information related to at least one session to be established for the UE 1 in the bearer-less network. Step 502 corresponds to Step 305 in FIG. 3A or Step 404 in FIG. 4A.

In Step 503, the core network receives a (NR) Handover Request Acknowledge message containing a Target to Source Transparent Container from the target NR NB 3. This Target to Source Transparent Container contains radio resource configuration information needed by the UE 1 to establish a radio connection associated with the bearer-less network. Step 503 corresponds to Step 306 in FIG. 3A or Step 405 in FIG. 4A.

In Step 504, the core network sends, to the source LTE eNB 2, a Handover Command message containing the Target to Source Transparent Container. Step 504 corresponds to Step 308 in FIG. 3B or Step 406 in FIG. 4B.

Figure 6:
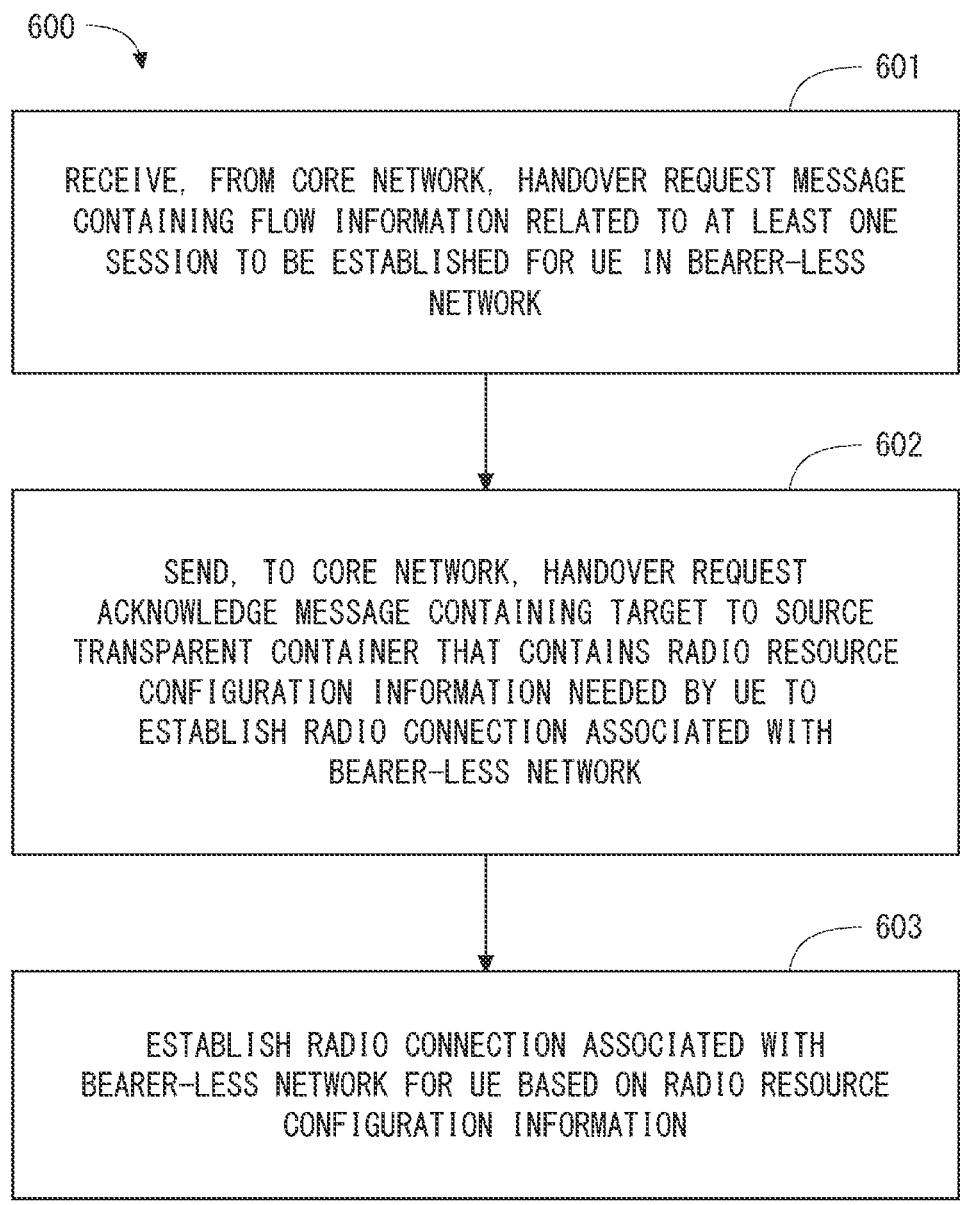
FIG. 6 is a flowchart showing an example of a method performed by a target NR NodeB (NR NB) according to the first embodiment.

FIG. 6 is a flowchart showing a process 600 that is an example of a method performed by the target NR NB 3. In Step 601, the target NR NB 3 receives, from the core network (i.e., NG Core 5), a (NR) Handover Request message containing flow information related to at least one session that is established for the UE 1 in the bearer-less network. Step 601 corresponds to Step 305 in FIG. 3A or Step 404 in FIG. 4A.

In Step 602, the target NR NB 3 sends, to the core network, a (NR) Handover Request Acknowledge message containing a Target to Source Transparent Container. This Target to Source Transparent Container contains radio resource configuration information needed by the UE 1 to establish a radio connection associated with the bearer-less network. Step 602 corresponds to Step 306 in FIG. 3A or Step 405 in FIG. 4A.

In Step 603, the target NR NB 3 establishes a radio connection associated with the bearer-less network for the UE 1 based on the radio resource configuration information. Step 603 corresponds to Step 310 in FIG. 3B or Step 408 in FIG. 4B.

Figure 7:
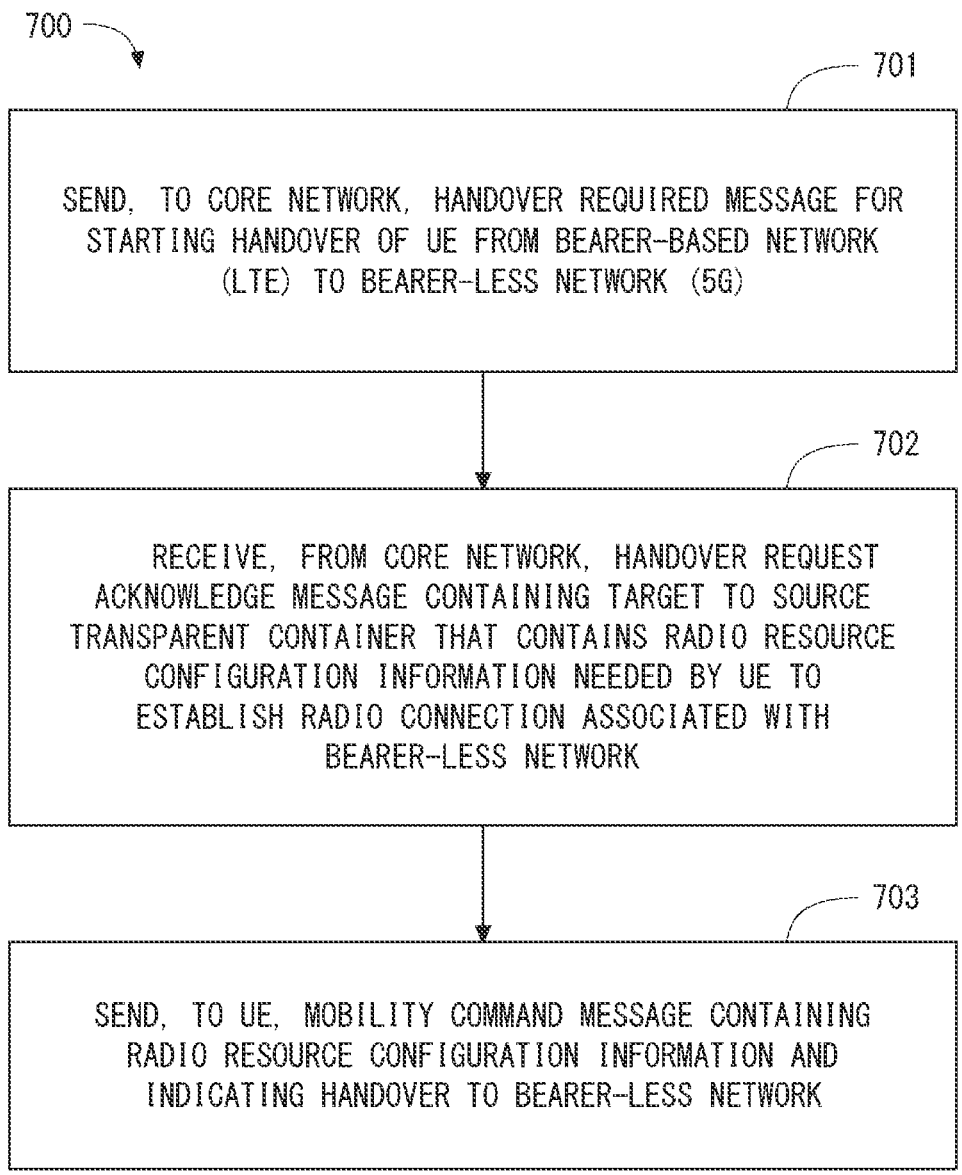
FIG. 7 is a flowchart showing an example of a method performed by a source LTE eNB according to the first embodiment.

FIG. 7 is a flowchart showing a process 700 that is an example of a method performed by the source LTE eNB 2. In Step 701, the source LTE eNB 2 sends, to the core network (i.e., EPC 4 or NG Core 5), a Handover Required message for starting a handover of the UE 1 from the bearer-based network (LTE) to the bearer-less network (5G). Step 701 corresponds to Step 302 of FIG. 3A or Step 402 of FIG. 4A.

In Step 702, the source LTE eNB 2 receives from the core network a Handover Command message containing a Target to Source Transparent Container. This Target to Source Transparent Container contains radio resource configuration information needed by the UE 1 to establish a radio connection associated with the bearer-less network. Step 702 corresponds to Step 308 in FIG. 3B or Step 406 in FIG. 4B.

In Step 703, the source LTE eNB 2 sends to the UE 1 a mobility command message (e.g., Handover Command message) containing the radio resource configuration information and indicating handover to a bearer-less network. Step 703 corresponds to Step 309 in FIG. 3B or Step 407 in FIG. 4B.

Figure 8:
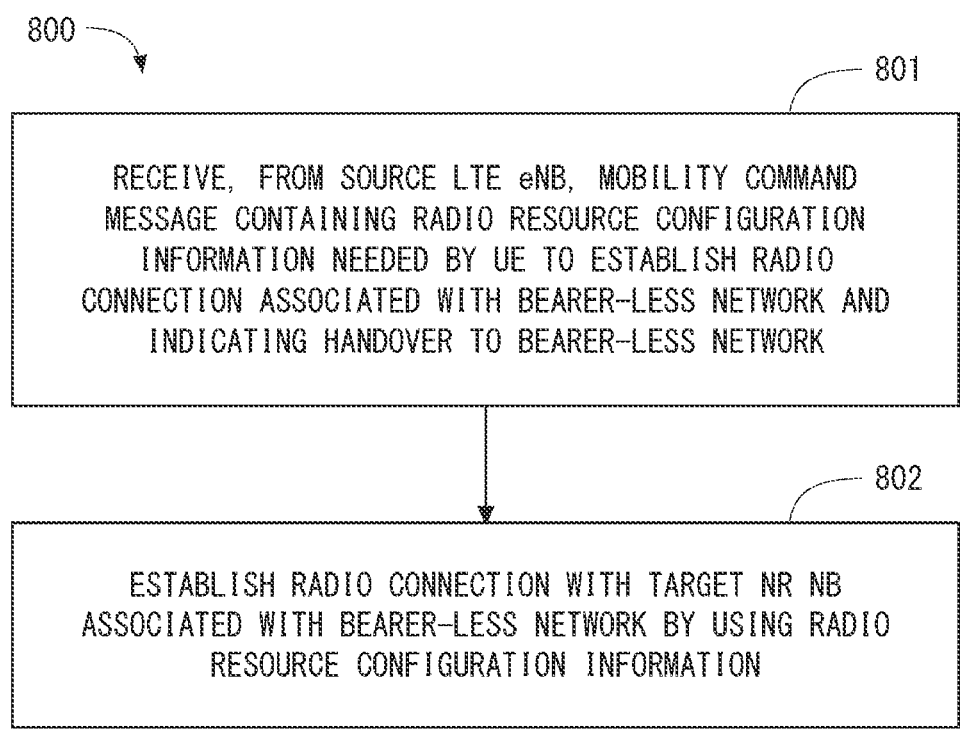
FIG. 8 is a flowchart showing an example of a method performed by a radio terminal according to the first embodiment.

FIG. 8 is a flowchart showing a process 800 that is an example of a method performed by the UE 1. In Step 801, the UE 1 receives a mobility command message (e.g., Handover Command message) from the source LTE eNB 2. This mobility command message contains radio resource configuration information needed by the UE 1 to establish a radio connection associated with the bearer-less network. Step 801 corresponds to Step 309 in FIG. 3B or Step 407 in FIG. 4B.

In Step 802, the UE 1 establishes a radio connection with the target NR NB 3 associated with the bearer-less network by using the radio resource configuration information. Step 802 corresponds to Step 310 in FIG. 3B or Step 408 in FIG. 4B.

The detailed procedure of the handover from the bearer-based network (LTE) to the bearer-less network (5G) according to this embodiment is not limited to the above-described specific examples. For instance, the names of messages in the handover procedure are not limited to those shown in the above-described several examples. In the above-described several examples of the handover procedure, the order of messages may be changed and some of them may be omitted. Further, they may include one or more additional messages.

As understood from the above descriptions, the procedure of handover from the bearer-based network (LTE) to the bearer-less network (5G) described in this embodiment includes:

Sending, by the core network (NG Core 5), flow information to the target NR NB 3;
    Generating, by the target NR NB 3, based on the flow information, radio resource configuration information needed by the UE 1 to establish a radio connection (e.g., an RRC connection or a radio bearer) associated with the bearer-less network (i.e., NG System); and
    Sending, by the target NR NB 3, the radio resource configuration information to the UE 1 through the source LTE eNB 2.

In this way, the UE 1 uses the radio resource configuration information generated by the target NR NB 3 based on the flow information, thereby appropriately configuring the Access Stratum (AS) layer of the target RAT associated with the bearer-less network (e.g., 5G).

As already described, the NG System including the NR NB 3 and the NG Core 5 may be configured to support a bearer-based transfer using a bearer per QoS class and per PDU session, or may be configured to distinguish between data flows (e.g., PDU flows) in the bearer to perform QoS handling (e.g., discard of packets) on a per-data-flow basis (e.g., on a per-PDU-flow basis). For example, the NR NB 3 may associate a bearer (e.g., NG3 bearer) configured between the NR NB 3 and a user plane function in the NG Core 5 with a radio bearer, perform packet forwarding between this bearer (e.g., NG3 bearer) and the radio bearer, and perform QoS handling (e.g., discard of packets) per data flow (e.g., PDU flow) in this bearer.

In this case, the flow information described in this embodiment may indicate an association between a bearer for the UE 1 (e.g., NG-RAB or NG3 bearer) and one or more packet flows (i.e., PDU flow(s)) for the UE 1 transferred through this bearer. In other words, the control node (e.g., CPF) in the NG Core 5 may send the flow information to the NR NB 3 to notify the NR NB 3 of an association between a bearer for the UE 1 (e.g., NG-RAB or NG3 bearer) and one or more packet flows (i.e., PDU flow(s)) for the UE 1 transferred through this bearer. The NR NB 3 may receive the flow information from the control node in the NG Core 5 and then, according to the received flow information, perform QoS handling (e.g., discard of packets) per data flow (e.g., PDU flow) in the bearer (e.g., NG3 bearer) configured between the NR NB 3 and the user plane function in the NG Core 5.

Second Embodiment

Figure 9A:
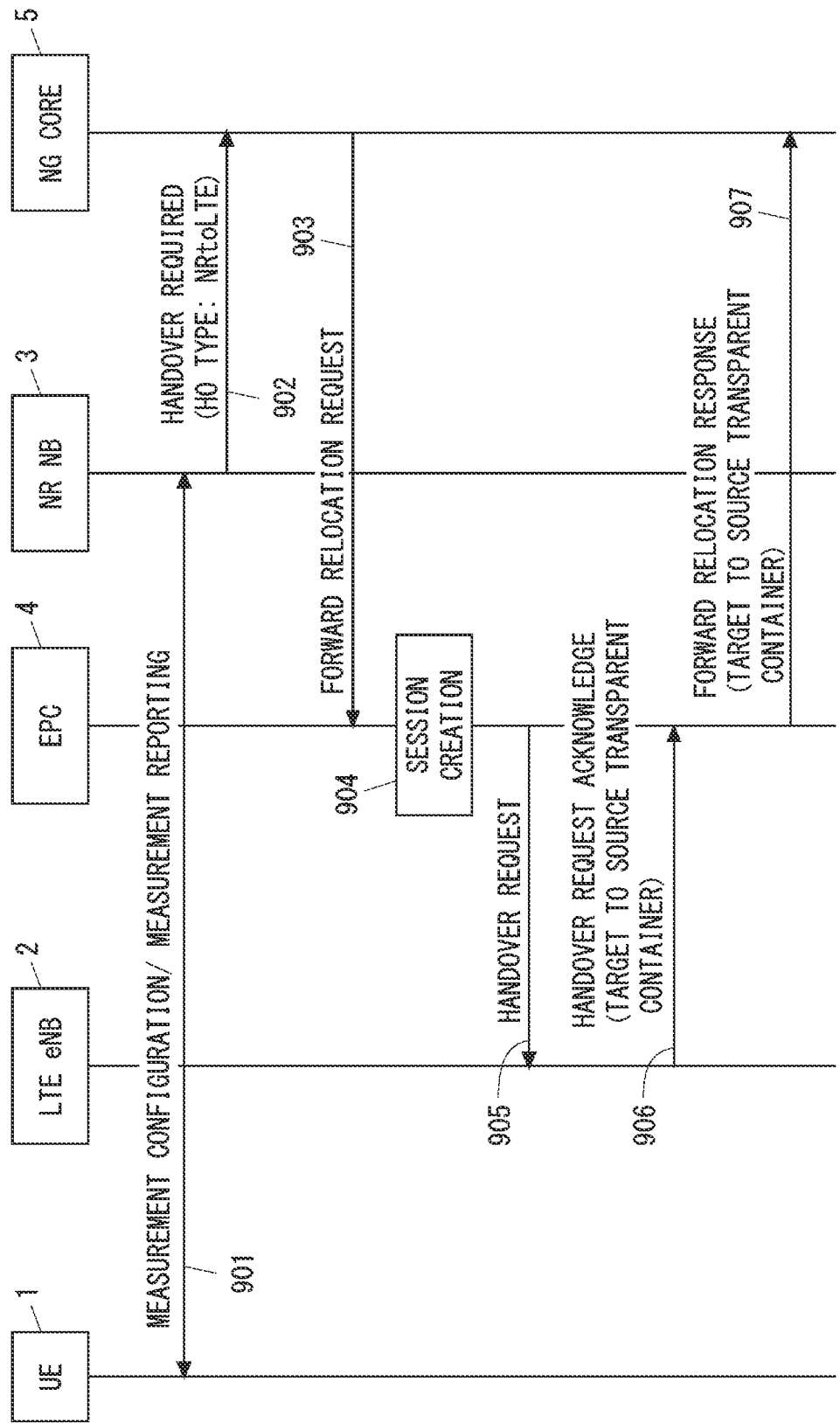
FIG. 9A is a sequence diagram showing an example of an inter-RAT handover procedure from an NG System to an LTE System according to a second embodiment.
Figure 9B:
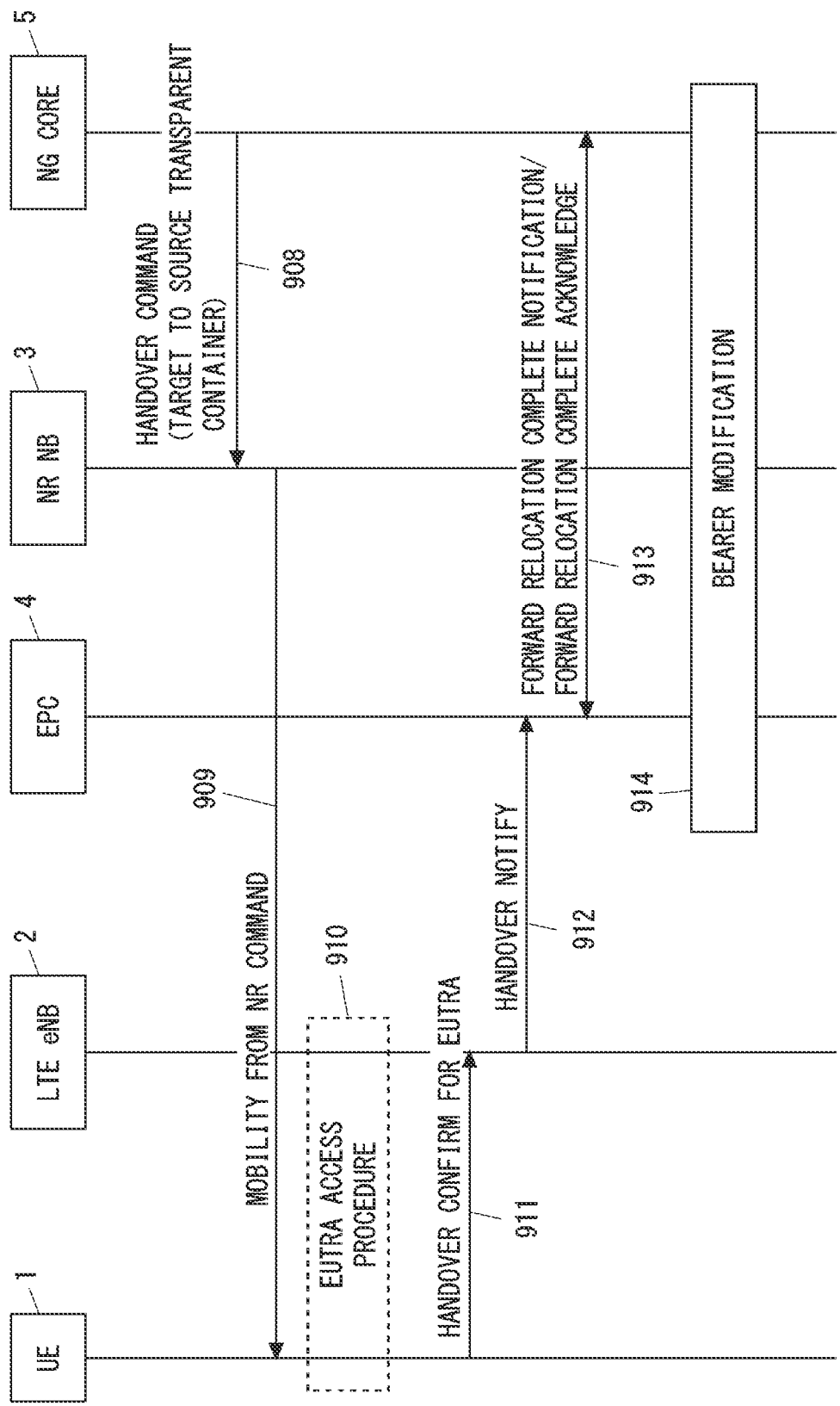
FIG. 9B is a sequence diagram showing the example of the inter-RAT handover procedure from the NG System to the LTE System according to the second embodiment.

This embodiment provides a method for handing over the UE 1 from an NG System (i.e., a bearer-less network) to an LTE System (i.e., a bearer-based network). FIGS. 9A and 9B show an example of a procedure for handing over the UE 1 from the NG System to the LTE System in the configuration example of the radio communication network shown in FIG. 1. FIG. 9A shows a handover preparation phase, while FIG. 9B shows a handover execution phase.

In the procedure shown in FIGS. 9A and 9B, the source base station (i.e., NR NB 3) starts handover by sending a Handover Required message on an interface (or reference point) between the source base station (i.e., NR NB 3) and the core network (i.e., NG Core 5). The procedure shown in FIGS. 9A and 9B may be enhancement/evolution of "UTRAN Iu mode to E-UTRAN Inter RAT handover" in LTE. Alternatively, the procedure shown in FIGS. 9A and 9B may be enhancement/evolution of "S1-based handover" with MME relocation in LTE.

In Step 901, the UE 1 is connected to the NR NB 3 and is in connected state (e.g., RRC_Connected). The UE 1 receives a Measurement Configuration from the NR NB 3, performs neighbor cell measurements and inter-RAT measurements including measurements of NG-RAN cells and E-UTRAN (LTE) cells according to the received measurement configuration, and sends a measurement report to the NR NB 3.

In Step 902, the NR NB 3 determines to perform inter-RAT handover to a cell of the LTE eNB 2 and sends a Handover Required message to the source control node in the NG Core 5. This Handover Required message includes an identifier of the target LTE eNB 2. Further, this Handover Required message may contain a Handover Type Information Element (IE) indicating that it is handover from NR to LTE. For example, "NRtoLTE" is set in the Handover Type IE. Alternatively, this Handover Required message may contain a target LTE eNB identifier information element (IE). This Handover Required message may contain a Source to Target Transparent Container IE.

In Step 903, the source control node in the NG Core 5 determines that the type of the handover is an Inter-RAT handover to the LTE System, based on the Handover Type IE or the Target LTE eNB Identifier IE contained in the received Handover Required message. The source control node in the NG Core 5 selects a target MME in the EPC 4. The source control node in the NG Core 5 sends a Forward Relocation Request message to the target MME to start a Handover resource allocation procedure. This Forward Relocation Request message contains a Mobility Management (MM) Context and all the PDU sessions that are active for the UE 1 in the source system (i.e., the NG system). Each PDN session includes an associated APN and a list of PDU flow Contexts. The MM Context includes information about a PDU flow(s) and security-related information. This Forward Relocation Request message further includes information for identifying one or more service data flows associated with each PDU flow context (e.g., SDF templates, or Traffic Flow Templates (TFTs)).

In Step 904, the target MME in the EPC 4 performs a procedure for creating a bearer-based session. Specifically, the target MME determines that the packet transfer node (or gateway) for the UE 1 needs to be relocated and selects a target transfer node (i.e., S-GW) in the EPC 4. The target MME sends a Create Session Request message to the target S-GW. This Create Session Request message may include information for identifying one or more service data flows associated with each PDU flow context (e.g., SDF templates, or Traffic Flow Templates (TFTs)). This information for identifying one or more service data flows is derived from the Forward Relocation Request message, which has been sent from the source control node in the NG Core 5 to the target MME in the EPC 4. The target S-GW allocates its local resources and sends a Create Session Response message to the target MME.

In Step 905, the target MME in the EPC 4 sends a Handover Request message to the target LTE eNB 2.

In Step 906, upon receiving the Handover Request message, the target LTE eNB 2 generates a UE context including information about an EPS bearer(s) and a security context, and allocates resources. Then, the target LTE eNB 2 sends a Handover Request Acknowledge message containing a Target to Source Transparent Container to the target MME.

In Step 907, the target MME in the EPC 4 sends a Forward Relocation Response message containing the Target to Source Transparent Container to the source control node in the NG Core 5. This Forward Relocation Response message may further include Addresses and a TEID assigned for downlink data forwarding. When indirect downlink forwarding is used, these addresses and TEID may be addresses and a TEID to the transfer node in the NG Core 5. When direct downlink forwarding is used, these addresses and TEID may be addresses and a TEID to the target LTE eNB 2.

In Step 908, the source control node sends a Handover Command message containing the Target to Source Transparent Container to the source NR NB 3. This Handover Command message may further contain a list of flows (e.g., PDU flow(s)) that are subject to downlink data forwarding (e.g., flows subject to data forwarding list). The "Flows Subject to Data forwarding list" IE includes, for example, an address(es) and a TEID(s) for user traffic data forwarding, and an identifier(s) of a flow(s) (e.g., PDU flow(s)) that is subject to data forwarding. The source NR NB 3 starts data forwarding for the flow(s) (e.g., PDU flow (s)) designated by the "flows Subject to Data forwarding list" IE.

In Step 909, the source NR NB 3 sends an RRC message containing a Handover Command message to the UE 1. This Handover Command message includes a transparent container containing the radio resource configuration information that has been set up by the target LTE eNB 2 in the preparation phase. This RRC message may be, for example, a Mobility from NR command message or an RRC Connection Reconfiguration message.

In Step 910, upon receiving the RRC message containing the Handover Command message, the UE 1 moves to the target RAN (i.e., E-UTRAN) and performs handover according to the radio resource configuration information provided by the Handover Command message. That is, the UE 1 establishes a radio connection with the target LTE eNB 2 associated with the bearer-based network (i.e., LTE System). In Step 911, the UE 1 sends a Handover Confirm for EUTRA message to the target LTE eNB 2 after it has successfully synchronized to the target cell. The message in Step 911 may be an RRC Connection Reconfiguration Complete message.

In Step 912, when the UE 1 has successfully accessed the target LTE eNB 2, the target LTE eNB 2 informs the target MME in the EPC 4 about that by sending a Handover Notify message.

In Step 913, the target MME in the EPC 4 recognizes that the UE 1 has arrived at the target side and informs the source control node in the NG Core 5 about that by sending a Forward Relocation Complete Notification message. The source control node sends a Forward Relocation Complete Acknowledge message to the target MME.

In Step 914, the target (e)MME in the EPC 4 performs a bearer modification procedure and thereby completes the Inter-RAT handover procedure. For example, the target MME may transmit a Modify Bearer Request message per session (i.e., per PDN connection) to an (e)S-GW in the EPC 4. This Modify Bearer Request message may contain a bearer identifier (e.g., EPS Bearer ID), and also contain an address and a downlink (DL) TEID of the target LTE eNB 2. The (e)S-GW in the EPC 4 may communicate with the edge node in the NG Core 5 to notify the edge node in the NG Core 5 of the relocation of the transfer node or the change of the RAT type due to the inter-RAT HO. Specifically, the S-GW in the EPC 4 may send a Modify Flow Request message per bearer-less session (i.e., per PDU session) to the edge node in the NG Core 5. The edge node in the NG Core 5 may send a Modify Flow Response message to the S-GW in the EPC 4. The S-GW in the EPC 4 may send a Modify Bearer Response message to the target MME.

Figure 10A:
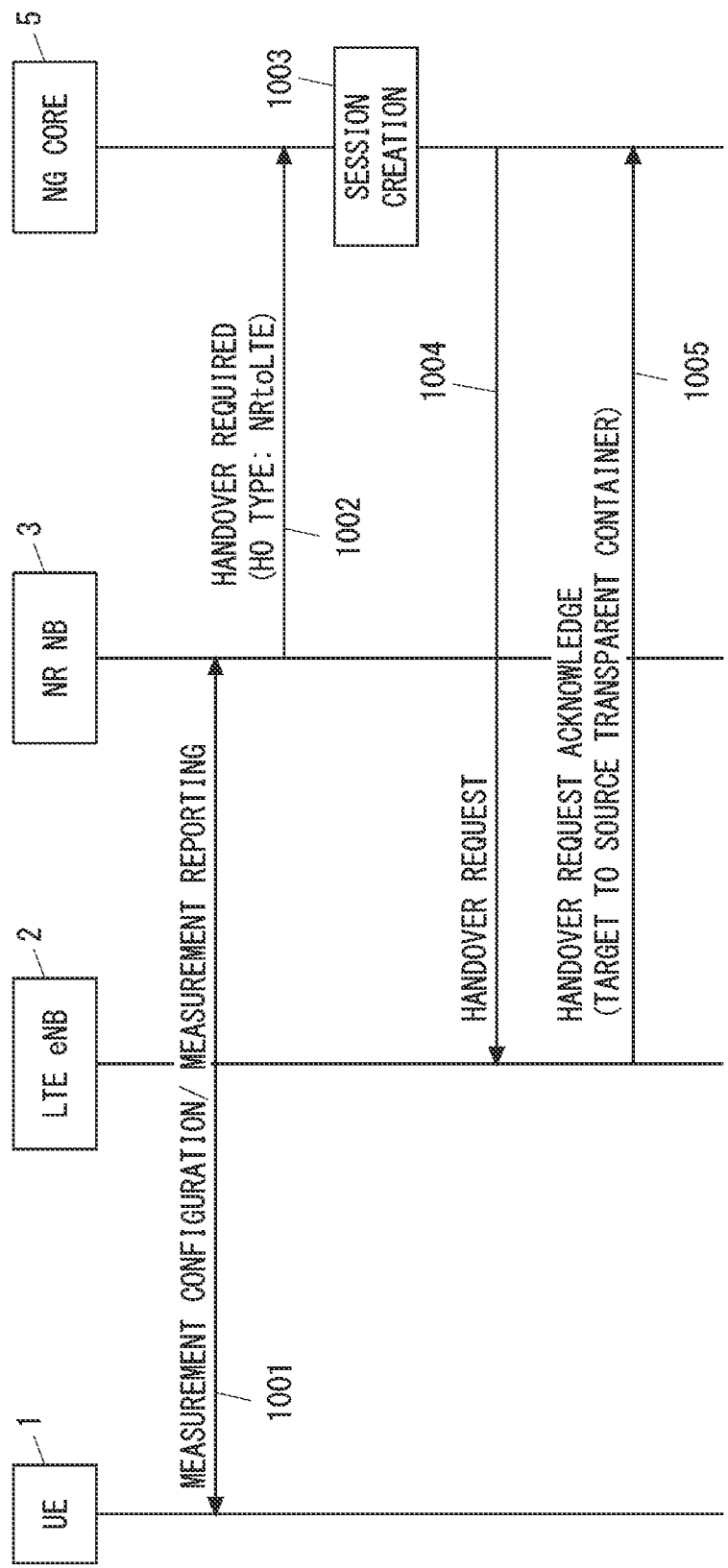
FIG. 10A is a sequence diagram showing another example of the inter-RAT handover procedure from the NG System to the LTE System according to the second embodiment.
Figure 10B:
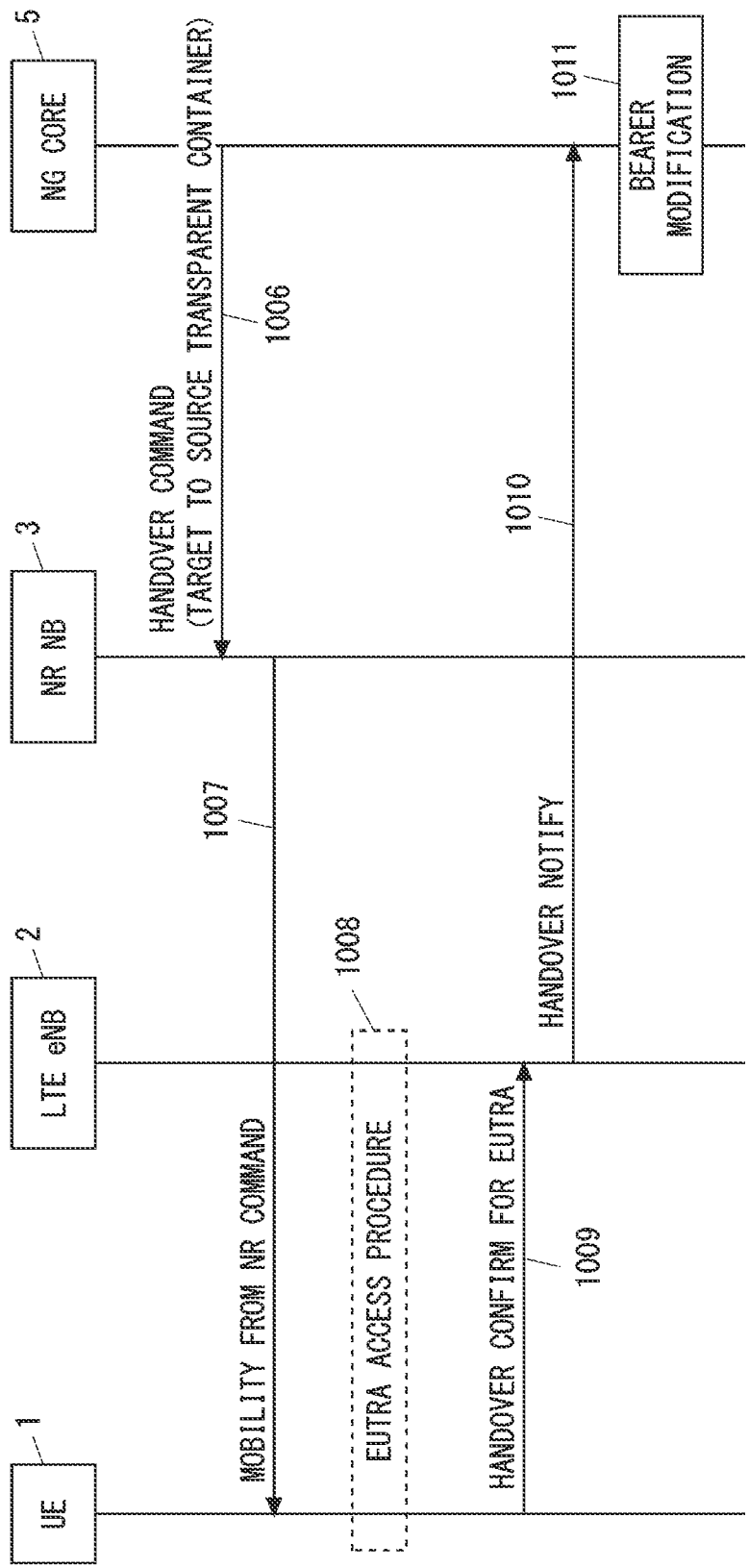
FIG. 10B is a sequence diagram showing the other example of the inter-RAT handover procedure from the NG System to the LTE System according to the second embodiment.

FIGS. 10A and 10B show an example of a procedure for handing over the UE 1 from the NG System to the LTE System in the configuration example of the radio communication network shown in FIG. 2. FIG. 10A shows a handover preparation phase, while FIG. 10B shows a handover execution phase.

Similarly to the procedure shown in FIGS. 9A and 9B, in the procedure shown in FIGS. 10A and 10B, the source base station (i.e., NR NB 3) starts handover by sending a Handover Required message on an interface between the source base station (i.e., NR NB 3) and the core network (i.e., NG Core 5). Similarly to the procedure shown in FIGS. 9A and 9B, the procedure shown in FIGS. 10A and 10B may be enhancement/evolution of "UTRAN Iu mode to E-UTRAN Inter RAT handover" in LTE, or may be enhancement/ evolution of "S1-based handover" with MME relocation in LTE.

Processes in steps 1001 to 1005 in FIG. 10A are similar to those in Steps 901 to 907 in FIG. 9A. In the procedure shown in FIG. 10A, illustration of Steps 903 and 907 shown in FIG. 9A is omitted. Processes corresponding to those in Steps 903 and 907 are performed within the NG Core 5.

Processes in steps 1006 to 1011 in FIG. 10B are similar to those in Steps 908 to 914 in FIG. 9B. In the procedure shown in FIG. 10A, illustration of Step 913 shown in FIG. 9B is omitted. Processes corresponding to those in Step 913 are performed within the NG Core 5.

The detailed procedure of the handover from the bearer-less network (5G) to the bearer-based network (LTE) according to this embodiment is not limited to the above-described specific examples. For instance, the names of messages in the handover procedure are not limited to those shown in the above-described several examples. In the above-described several examples of the handover procedure, the order of messages may be changed and some of them may be omitted. Further, they may include one or more additional messages.

Figure 11:
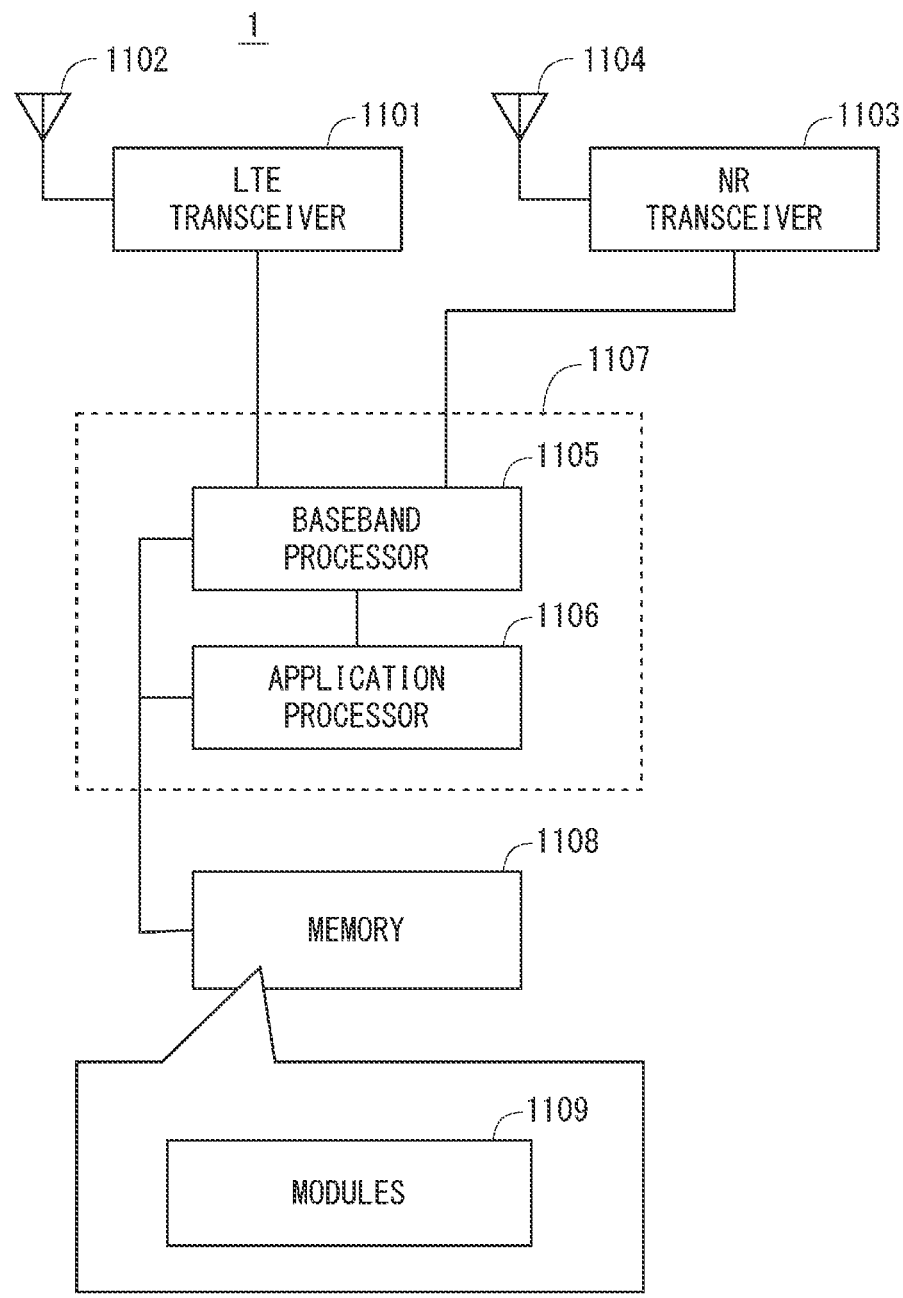
FIG. 11 is a block diagram showing a configuration example of a radio terminal according to some embodiments.

The following provides configuration examples of the UE 1, the LTE eNB 2, the NR NB 3, and the core network nodes according to the above-described embodiments. FIG. 11 is a block diagram showing a configuration example of the UE 1. An LTE transceiver 1101 performs an analog RF signal processing related to the PHY layer of the LTE RAT to communicate with the LTE eNB 2. The analog RF signal processing performed by the LTE transceiver 1101 includes frequency up-conversion, frequency down-conversion, and amplification. The LTE transceiver 1101 is coupled to an antenna 1102 and a baseband processor 1105. That is, the LTE transceiver 1101 receives modulated symbol data (or OFDM symbol data) from the baseband processor 1105, generates a transmission RF signal, and supplies the generated transmission RF signal to the antenna 1102. Further, the LTE transceiver 1101 generates a baseband reception signal based on a reception RF signal received by the antenna 1102 and supplies the generated baseband reception signal to the baseband processor 1105.

A New Radio (NR) transceiver 1103 performs an analog RF signal processing related to the PHY layer of the NG RAT to communicate with the NR NB 3. The New 5G transceiver 1103 is coupled to an antenna 1104 and the baseband processor 1105.

The baseband processor 1105 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and packet communication).

In the case of LTE or LTE-Advanced, for example, the digital baseband signal processing performed by the baseband processor 1105 may include signal processing of the Packet Data Convergence Protocol (PDCP) layer, Radio Link Control (RLC) layer, Medium Access Control (MAC) layer, and Physical (PHY) layer. Further, the control-plane processing performed by the baseband processor 1105 may include processing of Non-Access Stratum (NAS) protocol, RRC protocol, and MAC CEs.

The baseband processor 1105 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 1106 described in the following.

The application processor 1106 may also be referred to as a CPU, an MPU, a microprocessor, or a processor core. The application processor 1106 may include a plurality of processors (processor cores). The application processor 1106 loads a system software program (Operating System (OS)) and various application programs (e.g., communication application for acquiring metering data or sensing data) from a memory 1108 or from another memory (not shown) and executes these programs, thereby providing various functions of the UE 1.

In some implementations, as represented by a dashed line (1107) in FIG. 11, the baseband processor 1105 and the application processor 1106 may be integrated on a single chip. In other words, the baseband processor 1105 and the application processor 1106 may be implemented in a single System on Chip (SoC) device 1107. A SoC device may be referred to as a system Large Scale Integration (LSI) or a chipset.

The memory 1108 is a volatile memory, a nonvolatile memory, or a combination thereof. The memory 1108 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1108 may include, for example, an external memory device that can be accessed by the baseband processor 1105, the application processor 1106, and the SoC 1107. The memory 1108 may include an internal memory device that is integrated in the baseband processor 1105, the application processor 1106, or the SoC 1107. Further, the memory 1108 may include a memory in a Universal Integrated Circuit Card (UICC).

The memory 1108 may store one or more software modules (computer programs) 1109 including instructions and data to perform processing by the UE 1 described in the above embodiments. In some implementations, the baseband processor 1105 or the application processor 1106 may load the software modules 1109 from the memory 1108 and execute the loaded software modules, thereby performing the processing of the UE 1 described in the above embodiments.

Figure 12:
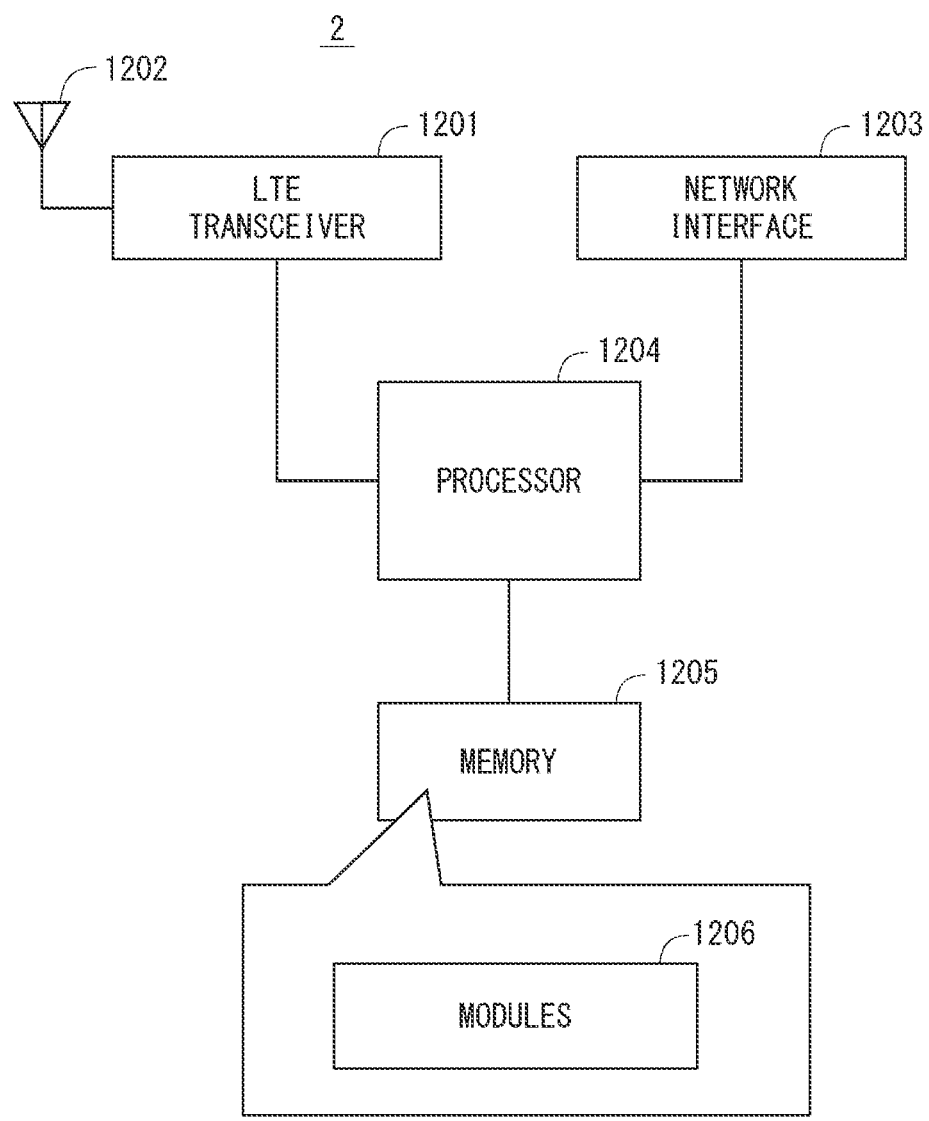
FIG. 12 is a block diagram showing a configuration example of a base station according to some embodiments.

FIG. 12 is a block diagram showing a configuration example of the LTE eNB 2 according to the above-described embodiments. As shown in FIG. 12, the LTE eNB 2 includes an LTE transceiver 1201, a network interface 1203, a processor 1204, and a memory 1205. The LTE transceiver 1201 performs analog RF signal processing to communicate with UEs that support the LTE RAT, including the UE 1. The LTE transceiver 1201 may include a plurality of transceivers. The LTE transceiver 1201 is connected to an antenna 1202 and the processor 1204. The LTE transceiver 1201 receives modulated symbol data (or OFDM symbol data) from the processor 1204, generates a transmission RF signal, and supplies the generated transmission RF signal to the antenna 1202. Further, the LTE transceiver 1201 generates a baseband reception signal based on a reception RF signal received by the antenna 1202 and supplies this signal to the processor 1204.

The network interface 1203 is used to communicate with network nodes (e.g., MME and S-GW in the EPC 4). The network interface 1203 may include, for example, a network interface card (NIC) conforming to the IEEE 802.3 series.

The processor 1204 performs digital baseband signal processing (i.e., data-plane processing) and control-plane processing for radio communication. In the case of LTE or LTE-Advanced, for example, the digital baseband signal processing performed by the processor 1204 may include signal processing of the PDCP layer, RLC layer, MAC layer, and PHY layer. Further, the control-plane processing performed by the processor 1204 may include processing of S1 protocol, RRC protocol, and MAC CE.

The processor 1204 may include a plurality of processors. The processor 1204 may include, for example, a modem processor (e.g., DSP) that performs the digital baseband signal processing and a protocol-stack-processor (e.g., CPU or MPU) that performs the control-plane processing.

The memory 1205 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 1205 may include a storage located separately from the processor 1204. In this case, the processor 1204 may access the memory 1205 through the network interface 1203 or an I/O interface (not shown).

The memory 1205 may store one or more software modules (computer programs) 1206 including instructions and data to perform processing by the LTE eNB 2 described in the above embodiments. In some implementations, the processor 1204 may load the one or more software modules 1206 from the memory 1205 and execute the loaded software modules, thereby performing the processing of the LTE eNB 2 described in the above embodiments.

Figure 13:
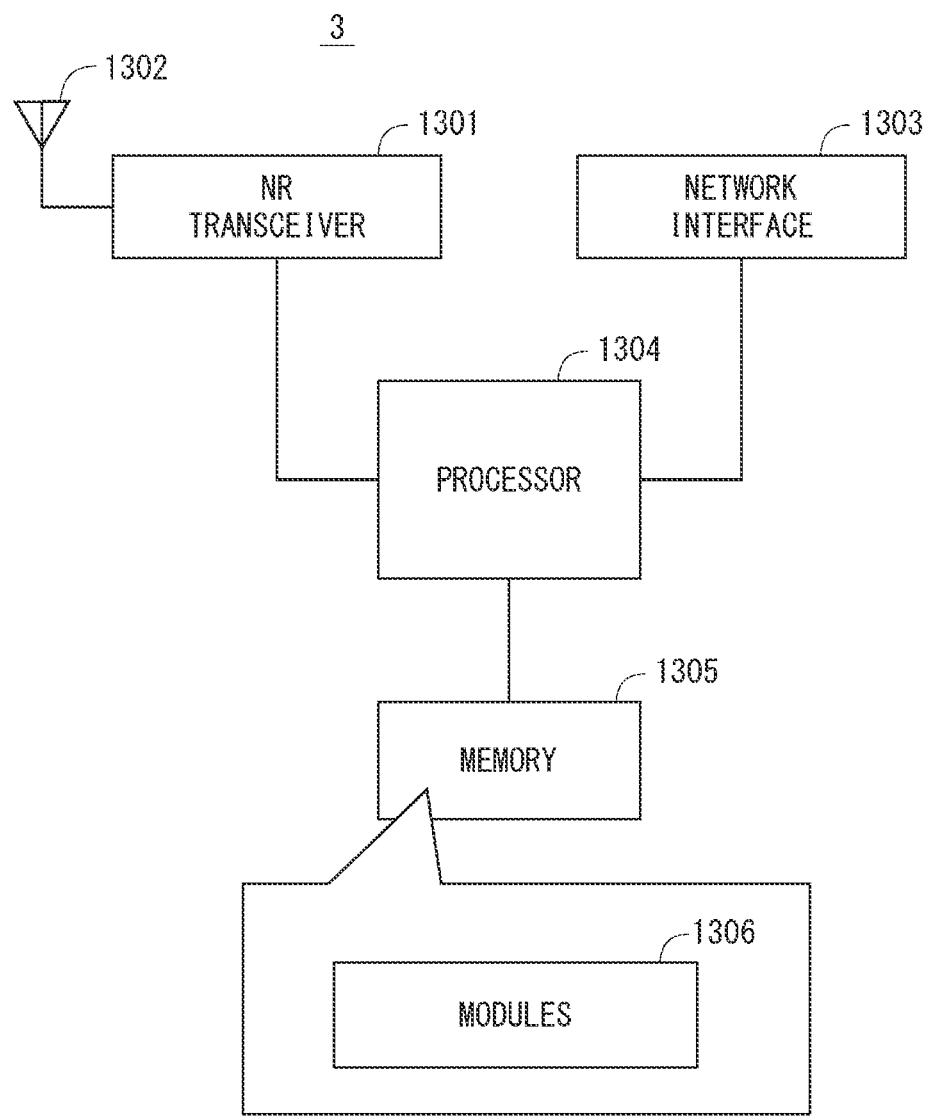
FIG. 13 is a block diagram showing a configuration example of a base station according to some embodiments.

FIG. 13 is a block diagram showing a configuration example of the NR NB 3 according to the above-described embodiments. As shown in FIG. 13, the NR NB 3 includes a New Radio (NR) transceiver 1301, a network interface 1303, a processor 1304, and a memory 1305. The NR transceiver 1301 performs analog RF signal processing to communicate with UEs that support the NG RAT, including the UE 1. The NR transceiver 1301 may include a plurality of transceivers. The NR transceiver 1301 is connected to an antenna 1302 and the processor 1304. The NR transceiver 1301 receives modulated symbol data from the processor 1304, generates a transmission RF signal, and supplies the generated transmission RF signal to the antenna 1302. Further, the NR transceiver 1301 generates a baseband reception signal based on a reception RF signal received by the antenna 1302 and supplies this signal to the processor 1304.

The network interface 1303 is used to communicate with network nodes (e.g., the control node and the transfer node in the NG Core 5). The network interface 1303 may include, for example, a network interface card (NIC) conforming to the IEEE 802.3 series.

The processor 1304 performs digital baseband signal processing (i.e., data-plane processing) and control-plane processing for radio communication. The processor 1304 may include a plurality of processors. The processor 1304 may include, for example, a modem processor (e.g., DSP) that performs the digital baseband signal processing and a protocol-stack-processor (e.g., CPU or MPU) that performs the control-plane processing.

The memory 1305 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 1305 may include a storage located separately from the processor 1304. In this case, the processor 1304 may access the memory 1305 through the network interface 1303 or an I/O interface (not shown).

The memory 1305 may store one or more software modules (computer programs) 1306 including instructions and data to perform processing by the NR NB 3 described in the above embodiments. In some implementations, the processor 1304 may load the one or more software modules 1306 from the memory 1305 and execute the loaded software modules, thereby performing the processing of the NR NB 3 described in the above embodiments.

Figure 14:
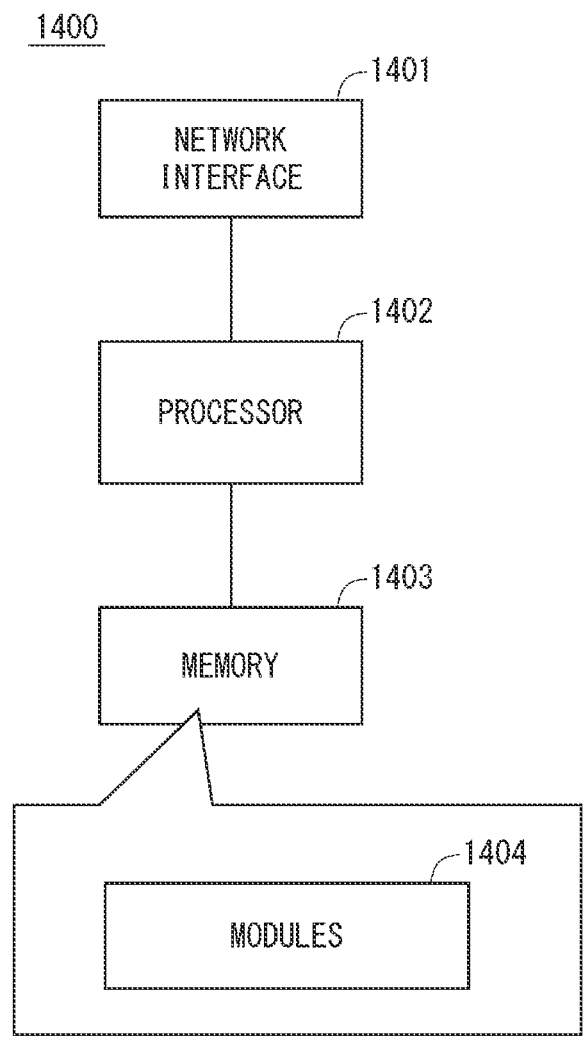
FIG. 14 is a block diagram showing a configuration example of a core network node according to some embodiments.

FIG. 14 is a block diagram showing a configuration example of a core network node 1400 according to the above-described embodiments. The core network node 1400 is, for example, the MME in the EPC 4 or the control node in the NG Core 5. As shown in FIG. 14, the core network node 1400 includes a network interface 1401, a processor 1402, and a memory 1403. The network interface 1401 is used to communicate with network nodes (e.g., RAN nodes or other core network nodes). The network interface 1401 may include, for example, a network interface card (NIC) conforming to the IEEE 802.3 series.

The processor 1402 may be, for example, a microprocessor, an MPU, or a CPU. The processor 1402 may include a plurality of processors.

The memory 1403 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 1403 may include a storage located separately from the processor 1402. In this case, the processor 1402 may access the memory 1403 through the network interface 1401 or an I/O interface (not shown).

The memory 1403 may store one or more software modules (computer programs) 1404 including instructions and data to perform processing by the core network node (e.g., the MME in the EPC 4 or the control node in the NG Core 5) described in the above embodiments. In some implementations, the processor 1402 may load the one or more software modules 1404 from the memory 1403 and execute the loaded software modules, thereby performing the processing of the core network node described in the above embodiments.

As described above with reference to FIGS. 11 to 14, each of the processors included in the UE 1, the LTE eNB 2, the NR NB 3, and the core network nodes in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Third Embodiment

This embodiment provides specific examples of the RRC messages and the control messages between the RAN and the core network (i.e., S1 and NG2 messages) described in the above embodiments.

FIGS. 15A and 15B show examples of a format of the Mobility from EUTRA command message. In the case of handover from the LTE System to the NG System, the MobilityFromEUTRACommand message includes a purpose set as "handover" and a targetRAT-Type set as "ngutra" corresponding to the NG RAN. Further, the MobilityFromEUTRACommand message includes targetRAT-MessageContainer. The targetRAT-MessageContainer contains an RRCConnectionReconfigurationNR message generated by the target NR NB 3. Furthermore, when the targetRAT-Type is "OTHERRAN", i.e., is "utra", "geran", or "ngutra", the MobilityFromEUTRACommand message includes nas-SecurityParamFromEUTRA.

FIG. 16 shows an example of a format of the Handover Required message (e.g., Step 302 in FIG. 3A) sent from the LTE eNB 2 to the MME in the EPC 4 on the S1 interface. This Handover Required message includes a Handover Type set as "LTEtoNR" and a Source to Target Transparent Container.

FIG. 17 shows an example of a format of the Handover Required message (e.g., Step 402 in FIG. 4A) sent from the LTE eNB 2 to the control node (e.g., the Common Control plane NF (CCNF)) in the NG Core 5 on the NG2 interface. This Handover Required message includes a Handover Type set as "LTEtoNR" and a Source to Target Transparent Container. Further, this Handover Required message includes a CCNF UE NG2AP ID and an eNB UE NG2AP ID. The CCNF UE NG2AP ID is an identifier assigned by the control node (e.g., CCNF) in the NG Core 5 to identify the UE 1 on the NG2 interface. The eNB UE NG2AP ID is an identifier assigned by the LTE eNB 2 to identify the UE 1 on the NG2 interface.

FIGS. 18 to 20 show several examples of a format of the Source NR NB to Target NR NB Transparent Container contained in the Handover Required message. In the example shown in FIG. 18, the Source NR NB to Target NR NB Transparent Container includes an RRC container and a NextGen (NG)-RABs Information List. The RRC container includes an RRC Handover Preparation Information message. The NG-RABs Information List indicates a list of radio access bearers (e.g., NG-RABs) handed over from the LTE eNB 2 to the NR NB 3. The format shown in FIG. 18 may be used when the NG System including the NR NB 3 and the NG Core 5 is configured to support a bearer-based transfer using a bearer per QoS class and per PDU session. A bearer may be configured between a pair of Network Functions (NFs), for example between the NR NB 3 and a user plane function in the NG Core 5, or between two user plane functions in the NG Core 5. A bearer in the NG System may be referred to as an NG-EPS-bearer and a radio access bearer in the NG System may be referred to as an NG-RAB.

The Source NR NB to Target NR NB Transparent Container shown in FIG. 19 includes an RRC container and an NG-RABs Information List as in the case of FIG. 18. However, the NG-RABs Information List shown in FIG. 19 includes a Flows Information List indicating a list of packet flows (e.g., PDU flows) mapped to each NG-RAB. The format shown in FIG. 19 may be used when the NG System including the NR NB 3 and the NG Core 5 is configured to support a bearer-based transfer using a bearer per QoS class and per PDU session and to distinguish between packet flows (e.g., PDU flows) in the bearer to perform QoS handling (e.g., discard of packets) on a per-data-flow basis (e.g., on a per-PDU-flow basis).

A Source NR NB to Target NR NB Transparent Container shown in FIG. 20 may include either or both of a Sessions Information List and an NG-RABs Information List. The format shown in FIG. 20 may be used when the NG System including the NR NB 3 and the NG Core 5 supports both the bearer-based transfer and the flow-based transfer. Further, the format shown in FIG. 20 may be used when the NG System including the NR NB 3 and the NG Core 5 supports only the flow-based transfer.

FIG. 21 shows an example of a format of the (NR) Handover Request message (e.g., Step 305 in FIG. 3A and Step 404 in FIG. 4A) sent from the NG Core 5 to the NR NB 3 on the NG2 interface. This (NR) Handover Request message includes a CCNF UE NG2AP ID. The CCNF UE NG2AP ID is an identifier assigned by the control node (CCNF) in the NG Core 5 to identify the UE 1 on the NG2 interface. Note that the CCNF is merely an example. That is, names of other control plane network functions or nodes (e.g., CNF, CPF, SMF, and MMF) may be used instead of the CCNF. This (NR) Handover Request message further includes a Security Context and NAS Security Parameters to NG-UTRAN. The Security Context indicates, for example, a Next Hop parameter (NH) and a Next Hop Chaining Counter parameter (NCC). The NAS Security Parameters to NG-UTRAN are included in the (NR) Handover Request message in the case of handover from the E-UTRAN to the NG RAN (NG-UTRAN). The Security Context and the NAS Security Parameters to NG-UTRAN may be configured per network slice.

Further, in the example shown in FIG. 21, the (NR) Handover Request message includes an NG-RABs To Be Setup List. The NG-RABs To Be Setup List indicates a list of radio access bearers (e.g., NG-RABs) that should be set up in the target NR NB 3. The format shown in FIG. 21 may be used when the NG System including the NR NB 3 and the NG Core 5 is configured to support a bearer-based transfer using a bearer per QoS class and per PDU session.

FIG. 22 shows a modified example of the (NR) Handover Request message. In the example shown in FIG. 22, the (NR) Handover Request message includes an NG-RABs To Be Setup List as in the case of FIG. 21. However, the NG-RABs To Be Setup List shown in FIG. 22 includes a Flows Information List indicating a list of packet flows (e.g., PDU flows) mapped to each NG-RAB. The format shown in FIG. 22 may be used when the NG System including the NR NB 3 and the NG Core 5 is configured to support a bearer-based transfer using a bearer per QoS class and per PDU session and to distinguish between packet flows (e.g., PDU flows) in the bearer to perform QoS handling (e.g., discard of packets) on a per-data-flow basis (e.g., on a per-PDU-flow basis).

FIG. 23 shows another modified example of the (NR) Handover Request message. The (NR) Handover Request message shown in FIG. 23 may include either or both of a Session To Be Setup List and a NG-RABs To Be Setup List. The Session To Be Setup List includes information about one or more sessions of the UE 1 to be handed over. For example, the Session To Be Setup List includes Slice Information per session. The Slice Information shown in FIG. 23 corresponds to the slice information described in the above embodiments. Further, the Session To Be Setup List includes a Session Endpoint Identifier (SEID) per session. The format shown in FIG. 23 may be used when the NG System including the NR NB 3 and the NG Core 5 supports both the bearer-based transfer and the flow-based transfer. Further, the format shown in FIG. 23 may be used when the NG System including the NR NB 3 and the NG Core 5 supports only the flow-based transfer.

FIG. 24 shows an example of a format of the Slice Information. As described in detail in the first embodiment, the Slice Information includes an identifier of a network slice determined (or selected) for the UE 1 (i.e., Network Slice Instance ID) and an identifier of a network function or a node associated with this network slice (i.e., Network Function ID). The Slice Information may include type information of the network slice (i.e., Multi-Dimensional Descriptor). Further, the Slice Information may include a Mobility Class or a Session Class or both.

FIG. 25 shows an example of a format of the Session Endpoint ID. As described in detail in the first embodiment, the Session Endpoint ID may be a GTP-TEID, a GRE-TEID, or an identifier of a network function or a node (NF ID).

FIG. 26 shows an example of a format of the (NR) Handover Request Acknowledge message (e.g., Step 306 in FIG. 3A and Step 405 in FIG. 4A) sent from the NR NB 3 to the NG Core 5 on the NG2 interface. This (NR) Handover Request Acknowledge message includes a Target to Source Transparent Container. The Target to Source Transparent Container includes radio resource configuration information (e.g., radio parameters) generated by the target NR NB 3. As shown in FIG. 27, the Target to Source Transparent Container may include an RRC Container containing an RRC NG-UTRA Handover Command message.

Further, in the example shown in FIG. 26, the (NR) Handover Request Acknowledge message includes an NG-RABs Admitted List. The NG-RABs Admitted List indicates a list of radio access bearers (e.g., NG-RABs) for which resources have been prepared in the target cell. The format shown in FIG. 26 may be used when the NG System including the NR NB 3 and the NG Core 5 is configured to support a bearer-based transfer using a bearer per QoS class and per PDU session.

FIG. 28 shows a modified example of the (NR) Handover Request Acknowledge message. In the example shown in FIG. 28, the (NR) Handover Request Acknowledge message includes an NG-RABs Admitted List as in the case of FIG. 26. However, the NG-RABs Admitted List shown in FIG. 28 includes a Flows Information List indicating a list of packet flows (e.g., PDU flows) mapped to each NG-RAB. The format shown in FIG. 28 may be used when the NG System including the NR NB 3 and the NG Core 5 is configured to support a bearer-based transfer using a bearer per QoS class and per PDU session and to distinguish between packet flows (e.g., PDU flows) in the bearer to perform QoS handling (e.g., discard of packets) on a per-data-flow basis (e.g., on a per-PDU-flow basis).

FIG. 29 shows another modified example of the (NR) Handover Request Acknowledge message. The (NR) Handover Request Acknowledge message shown in FIG. 29 may include either or both of a Session Admitted List and an NG-RABs Admitted List. The Session Admitted List includes information about one or more sessions of the UE 1 for which resources have been prepared in the target cell. The format shown in FIG. 29 may be used when the NG System including the NR NB 3 and the NG Core 5 supports both the bearer-based transfer and the flow-based transfer. Further, the format shown in FIG. 29 may be used when the NG System including the NR NB 3 and the NG Core 5 supports only the flow-based transfer.

FIG. 30 shows an example of a format of the Forwarding Address shown in FIG. 29. The Forwarding Address includes either or both of information for downlink data forwarding (i.e., DL Transport Layer Address and DL Session Endpoint ID) and information for uplink data forwarding (i.e., UL Transport Layer Address and UL Session Endpoint ID).

FIG. 31 shows an example of a format of the S1AP Handover Command message (e.g., Step 308 in FIG. 3B) sent from the MME in the EPC 4 to the LTE eNB 2 on the S1 interface. This Handover Command message includes an E-RABs Subject to Forwarding List. The E-RABs Subject to Forwarding List indicates E-RABs that are subject to data forwarding.

Further, in the case of handover from an E-UTRAN to an "OTHER RAN", in other words, when the Handover Type IE is set to "LTEtoNR (or LTEtoNGUTRAN)", "LTEtoUT-RAN", or "LTEtoGERAN", the S1AP Handover Command message includes NAS Security Parameters from E-UTRAN. The NAS Security Parameters from E-UTRAN include security-related information for Inter-RAT handover from the E-UTRAN.

FIG. 32 shows an example of a format of the NG2AP Handover Command message (e.g., Step 406 in FIG. 4B) sent from a control node (e.g., CCNF) in the NG Core 5 to the LTE eNB 2 on the NG2 interface. This Handover Command message includes a NE-RABs Subject to Forwarding List. The NE-RABs Subject to Forwarding List indicates NextGen E-RABs that are subject to data forwarding. Note that the NextGen E-RAB (e.g., NE-RAB) is an E-RAB set up between a UE and a User plane Function (e.g., CUNF) in the NG Core 5 through an eLTE eNB that is enhanced to support an interface with the NG Core.

Other Embodiments

Each of the above embodiments may be used individually, or two or more of the embodiments may be appropriately combined with one another.

The E-URAN and the NG RAN described in the above embodiments may be implemented based on a Cloud Radio Access Network (C-RAN) concept. The C-RAN is also referred to as a Centralized RAN. In this case, processes and operations performed by each of the LTE eNB 2 and the NR NB 3 described in the above embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), or a Distributed Unit (DU). The DU and the RU may provide the functions of the AS layer provided in the entire RAN while dividing them into functions provided by the DU and those provided by the RU. For example, the DU and the RU may be provided by a configuration in which a part of the AS layer (e.g., layer 2/layer 3 or their sublayers, or a part of the function of the layer) is disposed in the DU and the remaining layers (or the remaining part of the layer) is disposed in the RU. That is, processes and operations performed by each of the LTE eNB 2 and the NR NB 3 described in the above embodiments may be provided by one or more radio stations (or RAN nodes).

The NR NB 3 may be configured to dynamically change the allocation of the AS layers or their functions to the DU and the RU. In other words, the NR NB 3 may be configured to dynamically change a split point of the AS layers or their functions between the DU and the RU. For example, the NR NB 3 may be configured to dynamically select one of a plurality of different functional split options. In this case, in the HO procedure from LTE to NR in the above embodiments, the NG Core 5 may determine allocations of the AS layers or their functions to the DU and the RU of the NR NB 3 in response to receiving a Forward Relocation Request message or a Handover Required message. Alternatively, the NR NB 3 may determine allocations of the AS layers or their functions to the DU and the RU of the NR NB 3. The NG Core 5 or the NR NB 3 may select one functional split option to be applied to the NR NB 3 from among a plurality of predetermined functional split options.

In an example, the functional split option to be applied to the NR NB 3 may be determined (or selected) based on an E-RAB QoS information IE, e.g., a QCI or an ARP, or flow information included in the Forward Relocation Request message or the Handover Required message. Additionally or alternatively, the functional split option to be applied to the NR NB 3 may be determined based on a slice created by the NG Core 5 or the NR NB 3, or information about this slice (i.e., slice information). Additionally or alternatively, the functional split option to be applied to the NR NB 3 may be determined based on network slice assistance information included in NAS information transmitted from the UE 1.

Further, in the above embodiments, a UE identifier may be included in a message transferred between nodes. This UE identifier is used in the handover procedure to identify the UE 1 to be handed over.

More specifically, this UE identifier may be a UE identifier used on an interface (e.g., Sn interface or an NG2 interface, n is an integer) between the NR NB 3 and a control node that corresponds to an MME and is included in the NG Core 5. This UE identifier may be expressed as an NR NB UE SnAP ID (NR NB UE Sn Application Protocol Identifier) or an NR NB UE NG2AP ID.

Alternatively, this UE identifier may be a UE identifier used on an interface (e.g., Xn interface, n is an integer) between the NR NB 3 and the LTE eNB 2. This UE identifier may be expressed as an NR NB UE XnAP ID.

Alternatively, this UE identifier may be a UE identifier used on an interface (e.g., Sm interface, m is an integer) between an MME in the EPC 4 and a control node that corresponds to the MME and is included in the NG Core 5. This UE identifier may be expressed as an eMME UE SmAP ID.

Alternatively, this UE identifier may be a UE identifier that is used on an interface (e.g., S1 interface, 1 is an integer) between the LTE eNB 2 and a control node that corresponds to an MME and is included in the NG Core 5, and assigned by the control node. This UE identifier may be expressed as an eMME UE S1AP ID.

Further, these UE identifiers may be transferred among nodes during the handover procedure. Note that Sn, NG2, Sm, S1 and Xn which are used to identify respective interfaces are merely example and may be expressed by different symbols.

Further, the above-described embodiments are merely examples of applications of the technical ideas obtained by the inventors. These technical ideas are not limited to the above-described embodiments and various modifications may be made thereto.

For example, the whole or part of the embodiments disclosed above can be described as, but not limited to, the following supplementary notes.

(Supplementary Note 1)

A target radio access network (RAN) node associated with a bearer-less network, comprising:
- at least one memory; and
- at least one processor coupled to the at least one memory and configured to:
  - receive, from a core network, a handover request message requesting a handover of a radio terminal from a bearer-based network to the bearer-less network, the handover request message including flow information related to at least one session to be established in the bearer-less network in order to transfer at least one packet flow of the radio terminal; and
  - send to the core network, in response to the handover request message, a handover request acknowledge message containing a Target to Source Transparent Container, wherein the Target to Source Transparent Container includes radio resource configuration information derived from the flow information and is to be forwarded to a source RAN node associated with the bearer-based network through the core network.

(Supplementary Note 2)

The target RAN node described in Supplementary note 1, wherein the radio resource configuration information includes information indicating mapping between a bearer for the radio terminal used in the bearer-based network and at least one packet flow for the radio terminal used in the bearer-less network.

(Supplementary Note 3)

The target RAN node described in Supplementary note 1 or 2, wherein the flow information includes a flow identifier and a flow QoS parameter in respect of each packet flow of the radio terminal.

(Supplementary Note 4)

A source radio access network (RAN) node associated with a bearer-based network, comprising:
- at least one memory; and
- at least one processor coupled to the at least one memory and configured to:
  - send, to a core network, a handover required message for starting a handover of a radio terminal from the bearer-based network to a bearer-less network;
  - receive a handover command message containing a Target to Source Transparent Container from the core network, the Target to Source Transparent Container being generated by a target RAN node associated with the bearer-less network and including radio resource configuration information needed by the radio terminal to establish a radio connection associated with at least one session to be established in the bearer-less network in order to transfer at least one packet flow of the radio terminal; and
  - transmit, to the radio terminal, a mobility command message containing the radio resource configuration information and indicating a handover to the bearer-less network.

(Supplementary Note 5)

The source RAN node described in Supplementary note 4, wherein the radio resource configuration information includes information indicating mapping between a bearer for the radio terminal used in the bearer-based network and at least one packet flow for the radio terminal used in the bearer-less network.

(Supplementary Note 6)

The source RAN node described in Supplementary note 4 or 5, wherein the handover command message includes an identifier of each of at least one packet flow to be transferred by a bearer for the radio terminal used in the bearer-based network, and either or both of an address and an endpoint identifier assigned for data forwarding of each packet flow.

(Supplementary Note 7)

The source RAN node described in Supplementary note 6, wherein the at least one processor is configured to perform data forwarding of the at least one packet flow by using the identifier of each of the at least one packet flow, and either or both of the address and the endpoint identifier.

(Supplementary Note 8)

A radio terminal comprising:
- at least one memory; and
- at least one processor coupled to the at least one memory and configured to:
  - receive, from a radio access network (RAN) node associated with a bearer-based network, a mobility command message indicating a handover from the bearer-based network to a bearer-less network, the mobility command message being generated by a target RAN node associated with the bearer-less network and including radio resource configuration information needed by the radio terminal to establish a radio connection associated with at least one session to be established in the bearer-less network in order to transfer at least one packet flow of the radio terminal; and
  - establish the radio connection with the target RAN node associated with the bearer-less network by using the radio resource configuration information.

(Supplementary Note 9)

The radio terminal described in Supplementary note 8, wherein the radio resource configuration information includes information indicating mapping between a bearer for the radio terminal used in the bearer-based network and at least one packet flow for the radio terminal used in the bearer-less network.

(Supplementary Note 10)

A method in a target radio access network (RAN) node associated with a bearer-less network, the method comprising:
- receiving, from a core network, a handover request message requesting a handover of a radio terminal from a bearer-based network to the bearer-less network, the handover request message including flow information related to at least one session to be established in the bearer-less network in order to transfer at least one packet flow of the radio terminal; and
- sending to the core network, in response to the handover request message, a handover request acknowledge message containing a Target to Source Transparent Container, wherein the Target to Source Transparent Container includes radio resource configuration information derived from the flow information and is to be forwarded to a source RAN node associated with the bearer-based network through the core network.

(Supplementary Note 11)

A method in a source radio access network (RAN) node associated with a bearer-based network, the method comprising:

sending, to a core network, a handover required message for starting a handover of a radio terminal from the bearer-based network to a bearer-less network;

receiving a handover command message containing a Target to Source Transparent Container from the core network, the Target to Source Transparent Container being generated by a target RAN node associated with the bearer-less network and including radio resource configuration information needed by the radio terminal to establish a radio connection associated with at least one session to be established in the bearer-less network in order to transfer at least one packet flow of the radio terminal; and transmitting, to the radio terminal, a mobility command message containing the radio resource configuration information and indicating a handover to the bearer-less network.

(Supplementary Note 12)

A method in a radio terminal, the method comprising:

receiving, from a radio access network (RAN) node associated with a bearer-based network, a mobility command message indicating a handover from the bearer-based network to a bearer-less network, the mobility command message being generated by a target RAN node associated with the bearer-less network and including radio resource configuration information needed by the radio terminal to establish a radio connection associated with at least one session to be established in the bearer-less network in order to transfer at least one packet flow of the radio terminal; and establishing the radio connection with the target RAN node associated with the bearer-less network by using the radio resource configuration information.

(Supplementary Note 13)

A program for causing a computer to perform a method in a target radio access network (RAN) node associated with a bearer-less network, wherein the method comprises:

receiving, from a core network, a handover request message requesting a handover of a radio terminal from a bearer-based network to the bearer-less network, the handover request message including flow information related to at least one session to be established in the bearer-less network in order to transfer at least one packet flow of the radio terminal; and sending to the core network, in response to the handover request message, a handover request acknowledge message containing a Target to Source Transparent Container, wherein the Target to Source Transparent Container includes radio resource configuration information derived from the flow information and is to be forwarded to a source RAN node associated with the bearer-based network through the core network.

(Supplementary Note 14)

A program for causing a computer to perform a method in a source radio access network (RAN) node associated with a bearer-based network, wherein the method comprises:

sending, to a core network, a handover required message for starting a handover of a radio terminal from the bearer-based network to a bearer-less network;

receiving a handover command message containing a Target to Source Transparent Container from the core network, the Target to Source Transparent Container being generated by a target RAN node associated with the bearer-less network and including radio resource configuration information needed by the radio terminal to establish a radio connection associated with at least one session to be established in the bearer-less network in order to transfer at least one packet flow of the radio terminal; and transmitting, to the radio terminal, a mobility command message containing the radio resource configuration information and indicating a handover to the bearer-less network.

(Supplementary Note 15)

A program for causing a computer to perform a method in a radio terminal, wherein the method comprises:

receiving, from a radio access network (RAN) node associated with a bearer-based network, a mobility command message indicating a handover from the bearer-based network to a bearer-less network, the mobility command message being generated by a target RAN node associated with the bearer-less network and including radio resource configuration information needed by the radio terminal to establish a radio connection associated with at least one session to be established in the bearer-less network in order to transfer at least one packet flow of the radio terminal; and establishing the radio connection with the target RAN node associated with the bearer-less network by using the radio resource configuration information.

REFERENCE SIGNS LIST

1 User Equipment (UE)
2 LTE eNodeB (eNB)
3 New Radio (NR) NodeB (NB)
4 Evolved Packet Core (EPC)
5 NextGen (NG) Core
1105 BASEBAND PROCESSOR
1106 APPLICATION PROCESSOR
1108 MEMORY
1204 PROCESSOR
1205 MEMORY
1304 PROCESSOR
1305 MEMORY
1402 PROCESSOR
1403 MEMORY

The invention claimed is:

1. A method of a target radio access network (RAN) node, the method comprising:

receiving a Handover Request message from a core network during a handover of a radio terminal from a source RAN node to the target RAN node, the Handover Request message including information related to at least one Protocol Data Unit (PDU) session, the information including a flow indicator, a flow QoS parameter and priority indicator, the priority indicator indicating a relative importance of a flow compared to other flows; and transmitting to the core network, in response to the Handover Request message, a Handover Request Acknowledge message including a Target to Source Transparent Container, the Target to Source Transparent Container including radio resource configuration information, wherein the PDU session includes at least one flow, and wherein a QoS is handled on a per-flow basis.

2. The method according to claim 1, wherein the radio resource configuration information is transferred from the core network to the source RAN node.

3. A method of a core network, the method comprising:
- transmitting a Handover Request message to a target radio access network (RAN) node during a handover of a radio terminal from a source RAN node to the target RAN node, the Handover Request message including information related to at least one Protocol Data Unit (PDU) session, the information including a flow indicator, a flow QoS parameter and priority indicator, the priority indicator indicating a relative importance of a flow compared to other flows; and
- receiving a Handover Request Acknowledge message from the target RAN node in response to the Handover Request message, the Handover Request Acknowledge message including a Target to Source Transparent Container, the Target to Source Transparent Container including radio resource configuration information,
- wherein the PDU session includes at least one flow, and
- wherein a QoS is handled on a per-flow basis.

4. The method according to claim 3, wherein the radio resource configuration information is transferred from the core network to the source RAN node.

\* \* \* \* \*